(12) United States Patent
Constin

(10) Patent No.: US 9,785,189 B2
(45) Date of Patent: Oct. 10, 2017

(54) PORTABLE COMMUNICATION DEVICE

(75) Inventor: Hans Constin, Berlin (DE)

(73) Assignee: Constin GmbH, Berlin (DE)

( * ) Notice: Subject to any disclaimer, the term of this patent is extended or adjusted under 35 U.S.C. 154(b) by 182 days.

(21) Appl. No.: 13/576,576

(22) PCT Filed: Jan. 31, 2011

(86) PCT No.: PCT/DE2011/000088
§ 371 (c)(1),
(2), (4) Date: Oct. 25, 2012

(87) PCT Pub. No.: WO2011/091790
PCT Pub. Date: Aug. 4, 2011

(65) Prior Publication Data
US 2013/0040701 A1 Feb. 14, 2013

(30) Foreign Application Priority Data

Feb. 1, 2010 (DE) .......... 10 2010 006 820
Jan. 31, 2011 (DE) .......... 10 2011 009 876

(51) Int. Cl.
H04M 1/00 (2006.01)
G06F 1/16 (2006.01)
(Continued)

(52) U.S. Cl.
CPC ............ *G06F 1/162* (2013.01); *G06F 1/1681* (2013.01); *H04M 1/0216* (2013.01); *H04M 1/03* (2013.01);
(Continued)

(58) Field of Classification Search
CPC ..... G06F 1/162; G06F 1/1616; H04B 1/3838; H04M 1/0214; H04M 1/0216
(Continued)

(56) References Cited

U.S. PATENT DOCUMENTS 5,034,858 A 7/1991 Kawamoto et al.
5,661,632 A 8/1997 Register
(Continued)

FOREIGN PATENT DOCUMENTS

DE 196 03 483 4/1997
DE 103 47 999 10/2004
(Continued)

OTHER PUBLICATIONS

"Startup Guide, Compaq Notebook Series R3000", Nov. 30, 2003, pp. 1-38, XP55006252.
"Sony Ericsson P800 review", Mar. 23, 2003, XP55007198.

*Primary Examiner* — Ayodeji Ayotunde
(74) *Attorney, Agent, or Firm* — Norris McLaughlin & Marcus P.A.

(57) ABSTRACT

A portable communication device for multimedia applications including upper and lower parts connected by a joint element for moving the parts relative to each other between closed and various open positions. The upper part includes a display which is on the outside of the closed device. The joint element enables pivoting the upper part along a horizontal axis disposed below the plane of the display in a position that is shifted parallel outward or inward relative to the upper part as well as rotational motion of the parts relative to each other about a rotational axis which is tilted relative to the plane of the display, the motion being made when the rotational axis comes to a position perpendicular to the horizontal axis as a result of the pivoting motion. Optimum display and keypad size for PC use, slimmer design, and additional space for multimedia components are attained.

28 Claims, 25 Drawing Sheets

(51) Int. Cl.
*H04M 1/02* (2006.01)
*H04B 1/38* (2015.01)
*H04M 1/03* (2006.01)

(52) U.S. Cl.
CPC .... *H04M 2250/22* (2013.01); *H04M 2250/52* (2013.01)

(58) Field of Classification Search
USPC ............................... 455/556.1, 575.1, 575.3
See application file for complete search history.

(56) References Cited

U.S. PATENT DOCUMENTS

| | | |
|---|---|---|
| 6,580,932 B1 | 6/2003 | Finke-Anlauff |
| 6,587,675 B1 | 7/2003 | Riddiford |
| 7,200,428 B2 | 4/2007 | Taninai |
| 7,245,948 B2 | 7/2007 | Jung et al. |
| 7,376,447 B2 | 5/2008 | Yoshida et al. |
| 7,877,119 B2 | 1/2011 | Kim |
| 2002/0013161 A1 | 1/2002 | Schaeffer et al. |
| 2002/0102946 A1* | 8/2002 | SanGiovanni ...... H04M 1/0256 455/575.1 |
| 2003/0104791 A1* | 6/2003 | Engstrom et al. .............. 455/90 |
| 2004/0202316 A1* | 10/2004 | Abe .................... H04M 1/0227 379/451 |
| 2005/0101358 A1* | 5/2005 | Carpenter .................. 455/575.1 |
| 2005/0150080 A1* | 7/2005 | Lu .......................... G06F 1/1681 16/367 |
| 2006/0135085 A1 | 6/2006 | Chen |
| 2009/0034173 A1 | 2/2009 | Shaum |
| 2009/0149226 A1 | 6/2009 | Watanabe |
| 2009/0262079 A1 | 10/2009 | Bury et al. |
| 2010/0014237 A1* | 1/2010 | Takizawa ................. 361/679.21 |
| 2010/0245253 A1 | 9/2010 | Rhyu et al. |

FOREIGN PATENT DOCUMENTS

| | | |
|---|---|---|
| DE | 20 2008 017 733 | 4/2010 |
| EP | 0 394 879 | 10/1990 |
| EP | 0 932 861 | 8/1999 |
| EP | 1 161 062 | 12/2001 |
| EP | 1 437 878 | 7/2004 |
| EP | 1 450 545 | 8/2004 |
| EP | 1 675 366 | 6/2006 |
| EP | 1 862 880 | 12/2007 |
| EP | 1 887 761 | 2/2008 |
| EP | 2 234 377 | 9/2010 |
| JP | 2001-297513 | 10/2001 |
| WO | WO-2006/046084 | 5/2006 |

* cited by examiner

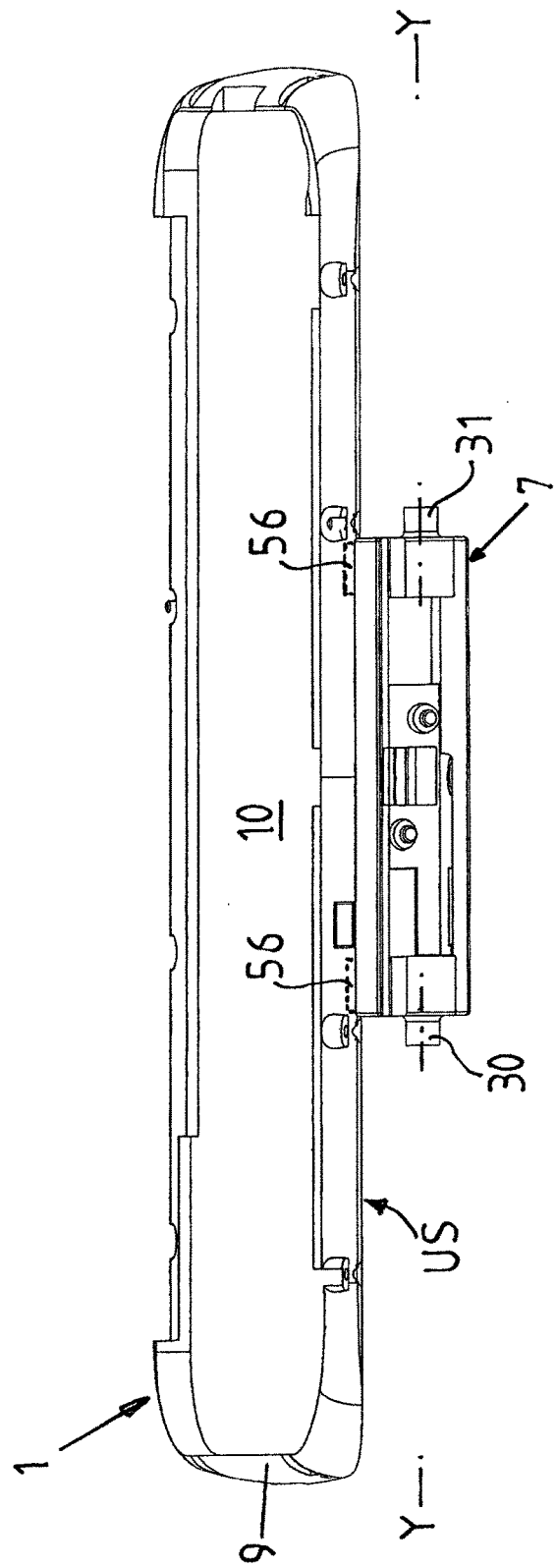

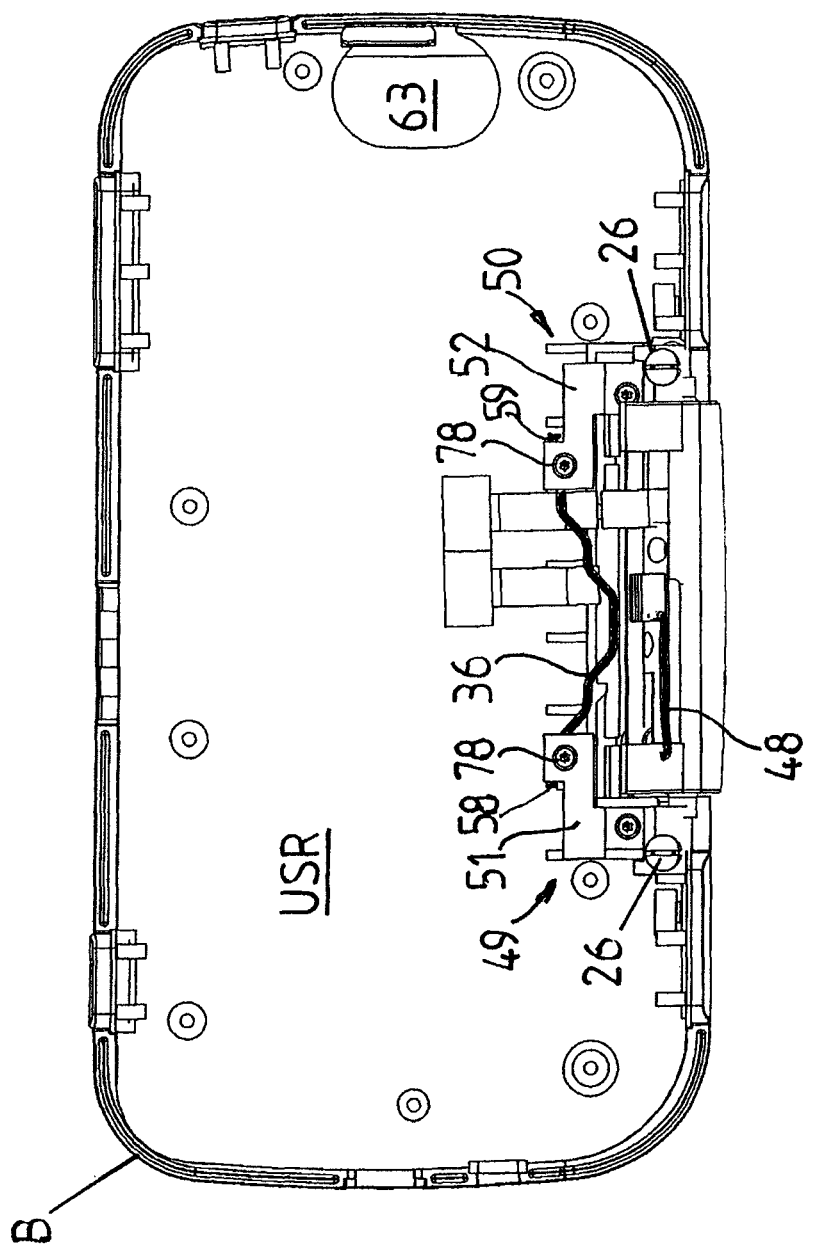

PORTABLE COMMUNICATION DEVICE

BACKGROUND OF THE INVENTION

The invention relates to a portable communication device for multimedia applications such as smart phones, cell phones, cell phone PCs or the like.

It is known that the housing of a laptop or a notebook consists of two housing parts that are connected together by way of a hinge, such that the two housing parts can be folded closed onto one another and open away from one another, wherein one housing part contains a display or a display unit and the other housing part contains a keypad or an input unit. When the housing is folded open, the two housing parts assume a tilted position relative to one another, and, in fact, when the housing part containing the keypad is lying on a horizontal base, the display is in a position that allows an observer to recognize on the display the characters or commands entered through the keypad.

Touch screen technology has led to relatively large displays for communications equipment since all the functions of a standard PC, and not just all the functions of a mobile telephone, are to be executable. On the other hand, the mobile communications equipment worn on the body or in the clothing must be light and small. Moreover, the visual display and the control elements, such as the display and the keys, must be ergonomically designed so that the devices are comfortable to use and so that there are no limitations compared to normal use of notebooks or PC's.

If the desire is to have a cell phone with functions and applications that are common to a standard PC, one would, on one hand, need as much surface area as possible for text input using fingers, and on the other hand, one would need a large display to show the contents of applications. This has led to communications devices such as multimedia cell phones comprising at least two parts, namely a cell phone with touch screen technology and a mini PC with a full QWERTZ-PC keypad (EP 1 887 761 A2, EP 1 862880 A1, EP 1 161 062 A1, DE 196 03 483 C2, EP 932 861 B1, DE 20 2008 017 733 U1). In this case, the cell phone and the mini PC share the display, such that the two parts can either be shifted linearly over one another (EP 1 887 761 A2), can be rotated out to the side about a perpendicular axis (EP 2 234 377 A2), or can be folded open and rotated in the folded-open state by 180° (EP 1 450 545 B1, WO 2006/046084 A1, JP 2001 298 513 A1, DE 103 47 999 B4).

The disadvantage of all of these known technical solutions is that the pivot axis for opening the communications device and the rotational axis for rotating the display are disposed above the lower part, resulting in a loss of valuable space for the display. Moreover, the installation of components, such as loudspeakers, microphones or the like, leads to limitation of the available area for the display, which is already small. This makes the known communications devices unwieldy and thick, and makes the operation thereof, particularly in the handling of the mini PC, fragile and laborious.

Another disadvantage is that the display is often times not optimally positioned relative to the user when it is opened up, or else the keypads used are not suitable or are poorly suitable for PC use, which quickly leads to fatigue during extended work.

Considering this prior art, the object of the invention is to provide a portable communications device, the display and keypad areas of which achieve an optimum size for a PC-type display and for use, and the thickness and weight of which are significantly reduced, while at the same time the handling of the PC part is improved, the range of multimedia applications is expanded, and the safety of the device against impact and blows is increased.

This object is achieved by a communications device of the class identified above comprising: a shell-shaped upper part with a frame, the part being provided for holding components of the communication device; the outside of the communication device being designed as a display; a lower part for holding an electronic module, said lower part being made up of at least a keypad, a frame section and a bottom shell; and a joint element for connecting the upper part and the frame section of the lower part, at a longitudinal side of said upper part and said frame section, said joint element permitting a pivoting of the upper part about a horizontal axis from the closed position of said upper part, at which the inside thereof lies on the keypad of the lower part to an open position back to a closed position, and permitting a pivoting of the upper part in the open position about a rotational axis within an angular range of at least 180°, so that in the open position the display faces the keypad or in the closed position is located outside again.

The solution according to the invention starts with the realization of pivoting the upper part along a horizontal axis disposed below the plane of the display in a position that is shifted parallel outward or inward relative to the upper part, and of making the rotational motion about a rotational axis that is tilted or bent relative to the plane of the display, the motion being made when the rotational axis comes to a position perpendicular to the horizontal axis as a result of the pivoting motion. This makes it possible to achieve an optimum display and keypad size for PC use and to achieve a lower design height of the communication device, while at the same time creating space for further multimedia components such as DVBT-TV, Internet radio, USB connections, and/or camera applications and game control buttons.

The invention is characterized in that the joint element is pivotably disposed in bearings disposed at a bottom side of the frame section, wherein the horizontal axis of the joint element lies in a position along the periphery of the lower part, the position being shifted parallel outward or inward relative to the frame of the upper part, and in that a pivot pin is provided that is disposed at the frame and protrudes in the direction of the lower part, and is tilted 90° relative to the display.

In a preferred embodiment variant of the communication device according to the invention, the frame of the upper part comprises an incline designed from inside to outside, at least near the joint element, wherein a pivot pin is placed without play and rotatably disposed in a pin seat provided in the joint element, and wherein protrusions are provided at the joint element, stops being provided for the protrusions at the recess of the frame section of the lower part, the stops limiting the pivoting motion to a first open position where the frame of the upper part can rotate about the pivot pin until another protrusion provided at the joint element engages in one of the respective depressions provided in the incline for purposes of limiting the rotational motion, wherein after the completion of the rotational motion the display comes to lie in a second open position in which the keypad and the display assume a working position relative to one another.

The pivot pin can be solid or hollow, without leaving the spirit of the invention.

In a preferred embodiment of the communications device according to the invention, the tilt angle of the pivot pin relative to the plane of the display is up to 90°, preferably 45°. This means that the upper part reaches the first open position at opening angles of preferably between 45° to 65° in interplay with the protrusions and stops present at the joint element, wherein the incline is adjusted to the tilt of the pivot pin.

After reaching the first open position, the tilted rotational axis of the pivot pin comes to a position that is perpendicular to the pivot axis, such that it is possible to rotate or turn the upper part comprising the display by 180°. The upper part and the display then assume a second open position at which the opening angle is between preferably 135° and 180°.

A particular advantage is that the frame of the upper part comprises a peripheral edge that, in turn, encloses the outside of a peripheral protrusion formed on the frame section of the lower part, such that the communication device is enclosed in a form-fitted manner for the protection thereof in the closed position. This makes the communication device less sensitive to impacts or blows since the forces are introduced to a closed frame and can thus distribute without affecting the sensitive display.

According to another preferred embodiment of the communication device according to the invention, the joint element is designed eccentrically and comprises cogged ends, wherein the joint element comprises at least a main body and a bearing part. These are fastened together by way of screw connections and form a holding space for a permanent magnet, an entry space for a flexible cable, and the pin seat with an annular chamber, which communicates with the entry space, the annular chamber allowing the routing of the flexible cable, wherein cylindrical shaft ends for rotatably holding bearings designed at the bottom side of the frame section are formed at the cogged ends of the joint element in alignment with the pivot axis.

Suitable metals for the joint element include light metal alloys such as Al—Mg alloys or even steel, so that sufficient strength is achieved in the smallest possible space.

In another preferred embodiment of the communication device according to the invention, the flexible cable electrically connects the electronic equipment in the lower part with the electronic equipment in the upper part by way of the entry space in the joint element, through the annular chamber and the pivot pin seat, in a plurality of spiral windings of the pivot pin, such that data can be exchanged between the electronic equipment.

Another advantage for a compact but thin design of the communication device according to the invention is that the protrusion for limiting the rotational motion from the first open position to the second open position is disposed at a cogged end of the joint element directly next to the holding space for the permanent magnet approximately perpendicular above the shaft end, wherein each of the protrusions for limiting the pivoting motion to the first open position is disposed parallel in alignment to the pivot axis at the side of the cogged ends of the joint element facing away from the shaft.

Moreover, the bearing part that is inserted into the main body of the joint element has a guide notch, which aligns with the protrusions and/or the pivot axis of the joint element, and which holds a multiply bent spring clamp, which can exert a spring force on the frame of the upper part as soon as the spring ends of the spring clamp are supported by tension at the contact points thereof at the brackets, whereupon the upper part and the display thereof can be brought to a third open position, the opening angle of the third open position preferably being up to 30°.

Furthermore, it is particularly advantageous that a holding space for a permanent magnet is disposed in the incline of the frame associated with the joint element, and the holding space, when in the second open position, is disposed such that the permanent magnets in the joint element and in the incline lie along a common vertical axis relative to one another, such that the magnets each fix the rotational motion with the N-S alignments thereof being lined up together.

Another preferred embodiment variant of the communication device according to the invention provides that the pivot pin is in operative connection with a compression spring fixed at one end in a blind hole of the pivot pin and at the other end at the main body in such a way that the restoring force of the spring supports or automatically executes the rotational motion to the second open position after the first open position has been reached.

In another preferred embodiment of the communication device according to the invention, the bearings for holding the shaft ends are disposed opposite one another in alignment with the horizontal axis of the joint element at the recess and are formed from a bearing half-shell formed in the bottom side of the frame section and from a bracket, each formed bearing half-shell of said bearings comprising a rear stop which prevents an axial shifting of the shaft ends. Another bearing half-shell is formed in the bracket, wherein the bracket is fastened to the bearing half-shell formed in the bottom side of the frame section by way of screws such that the bearing half-shells lie one atop the other and form the bearing. For a low friction, low wear bearing, the bearing half-shells are made of plastic.

In a preferred further embodiment of the communication device according to the invention, the frames of the upper part and the pivot pin are made of metal or plastic, and the frame section and the bottom shell of the lower part are made of plastic, wherein the pivot pin is either substance-bonded or form-fitted to the frame of the upper part. For the case in which the frame is made of plastic, the pivot pin can be made cheaply in an injection molding process.

As another advantage for a space-saving design of the communication device according to the invention, the components of the communication device, such as a loudspeaker, microphone and/or camera, are disposed in the lower part, wherein the loudspeaker is disposed in a depression formed in the bottom side of the frame section of the lower part, and the sound direction of the loudspeaker faces the display, wherein a first sound outlet opening, which is disposed at the outer back side edge of the frame section in the direction of the display, and a second sound outlet opening cut out at the upper edge of the base part are provided for the loudspeaker.

In another advantageous embodiment of the communication device according to the invention, a loudspeaker for listening and another loudspeaker for ringing are provided, wherein the loudspeaker for listening is connected to the sound outlet opening through a closed channel, and the loudspeaker for ringing is connected to a different sound outlet opening.

It is further advantageous that at least two microphones can be provided for suppressing secondary noises when making voice recordings.

A special embodiment of the communications device according to the invention provides, as a camera, a camera module, which comprises a digital camera with a flash device, and which is optionally removable from the bottom shell of the lower part.

It is also advantageous that the keypad lie on the frame section of the lower part and can be replaced from the outside, the keypad being designed as a mechanical keypad with a touchscreen function, wherein the keys of the keypad are arranged in a matrix of 5×11 fields, the cursor key takes up four fields and the space key takes up two fields so that a total of 51 keys are available, and the ESC, Tab, small type/capitals switch and CTRL keys are arranged vertically in the first column of the matrix, wherein these keys are available directly and with full value.

In another embodiment variant of the communications device according to the invention, the upper part comprises a switch button for multimedia applications (cell phone, smart phone) above the lower end thereof, and a switch button for the electronic module. At a longitudinal side of the frame opposite the joint element, two multimedia buttons are provided on the display, the functions of which can be shown on the display depending on the need and on the application. On both longitudinal sides, the frame section and the bottom shell have recesses for holding buttons, such as gaming buttons, push-to-talk buttons or the like.

Other advantages and details are found in the following description, with reference to the attached drawings.

EXEMPLARY EMBODIMENT

The invention is explained in further detail below with the aid of an exemplary embodiment.

BRIEF DESCRIPTION OF THE DRAWINGS

FIGS. 12a to 12c, the back side of the upper part;

DETAILED DESCRIPTION OF THE INVENTION

Figure 1:
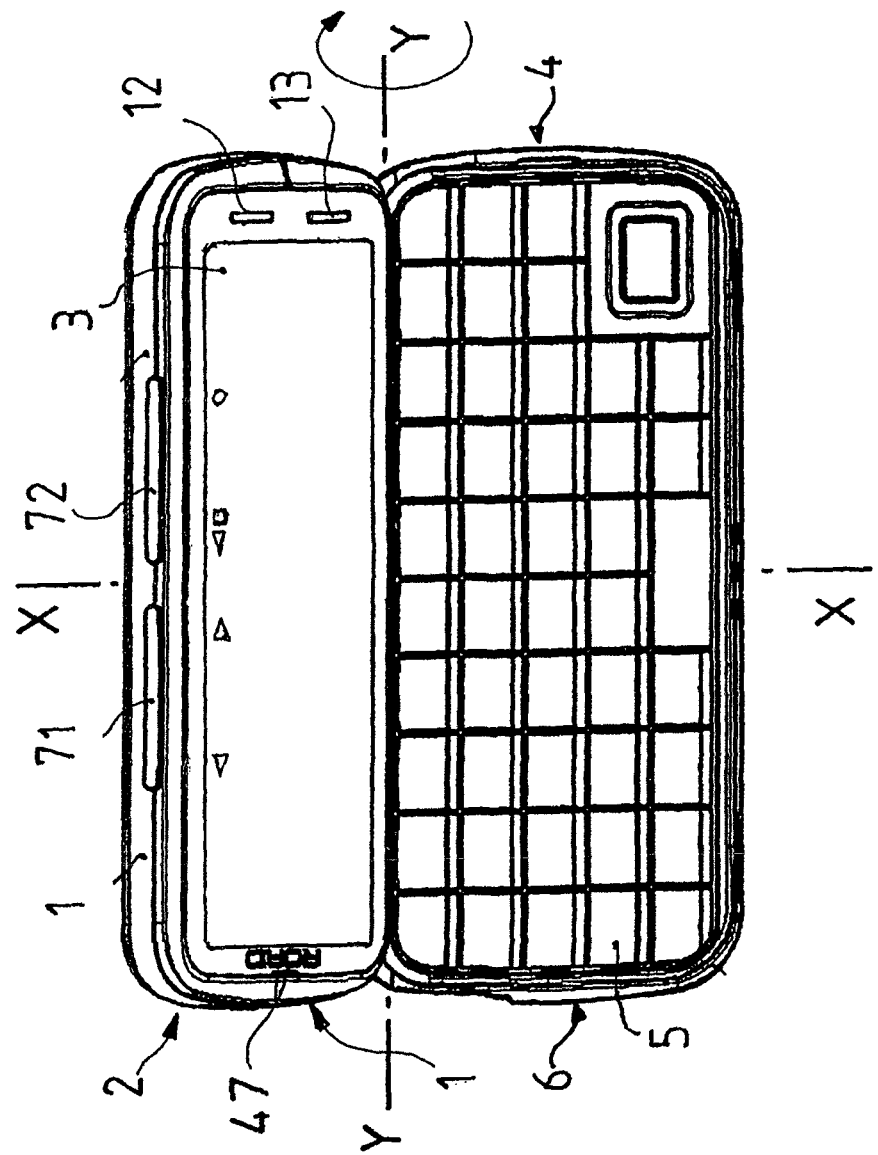
FIG. 1, a perspective representation of the communication device according to the invention in the folded open state for PC application.
Figure 2:
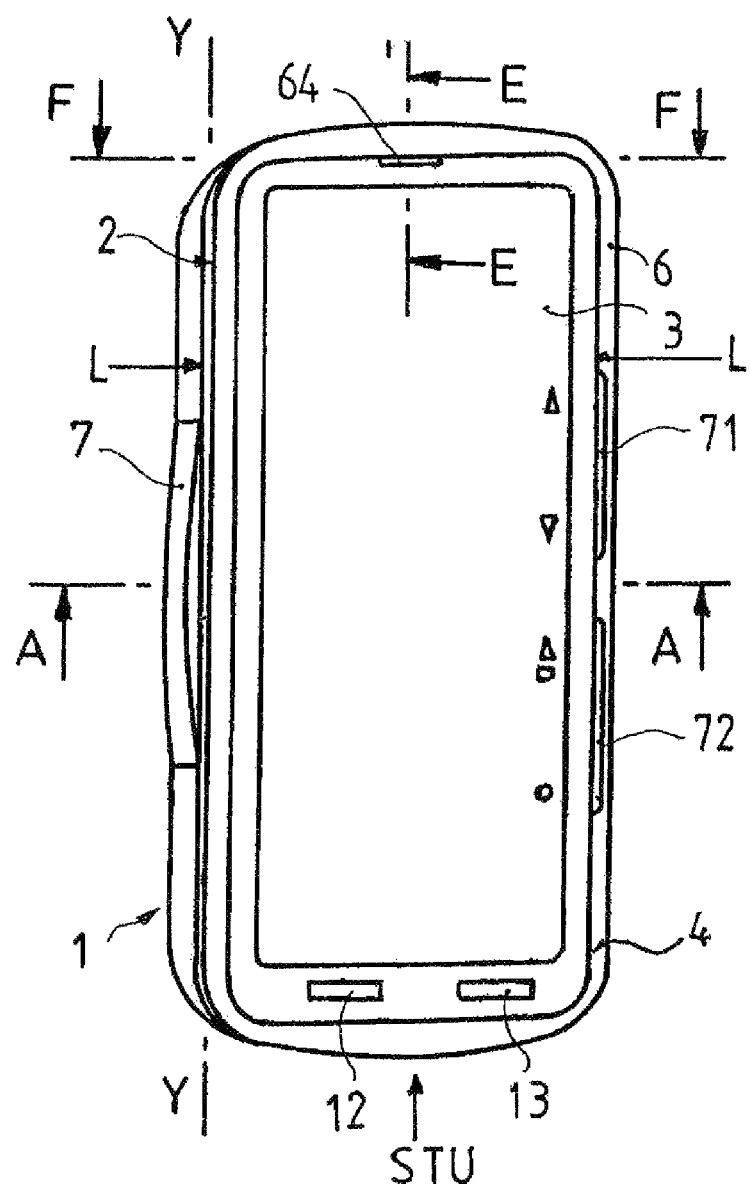
FIG. 2, a frontal view of the communication device according to the invention in the folded closed state for cell phone and camera application.

FIGS. 1 and 2 show an example of a communication device according to the invention that substantially comprises a shell-shaped upper part 1 that holds a cell phone 2 with a full display 3, a lower part 6 that holds an electronic module 4 (see FIG. 7) with a keypad 5, and a joint element 7 that connects the upper part 1 and the lower part 6, said joint element being fastened to a longitudinal side L of the upper and the lower part 1 and 6. The upper and lower parts 1 and 6 are designed to be folded together toward one another and opened apart away from one another by way of a horizontal pivot axis Y-Y that extends through the joint element 7, the parts also able to rotate about a vertical rotational axis X-X.

The upper part 1 has a frame 8 that is formed as a peripheral edge 9 that is rounded upward. Placed in the frame 8 is a base 10 that is held thereon in a form-fitted manner, such that the edge 9 and frame form a depression 11 for the purpose of holding the display 3.

Above the lower end STU of the upper part 1 are switch buttons 12 and 13, which are for operating a multimedia application, such as a cell phone or smart phone, and the electronic module 4.

The frame 8 and the base 10 form an edge 14 at the bottom side US of the upper part 1, the edge protruding peripherally downward and being interrupted by an outwardly-extending incline 15 at the longitudinal side LS associated with the joint element 7.

Figure 3:
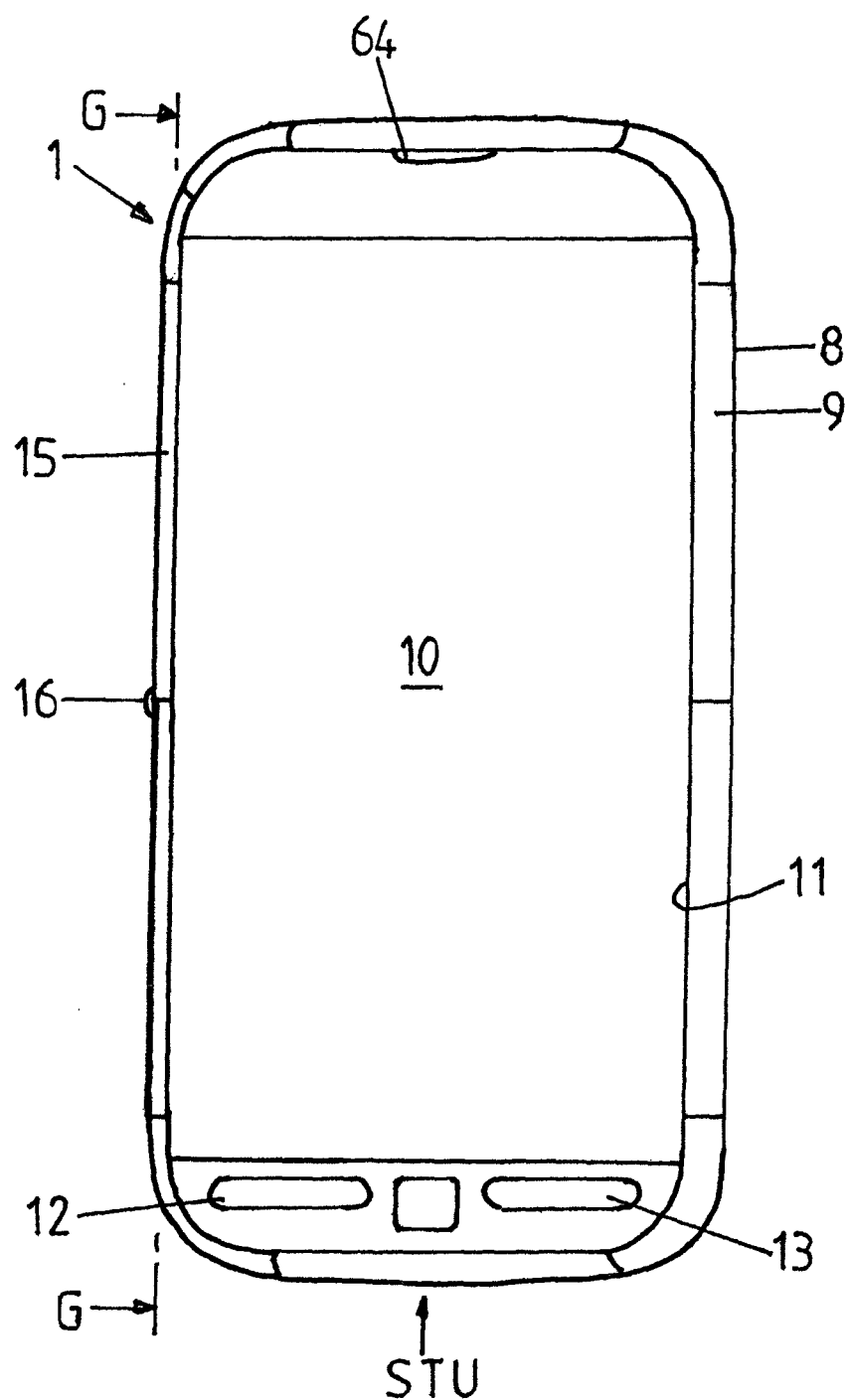
FIG. 3, a top view of the upper part without the display.
Figure 4:
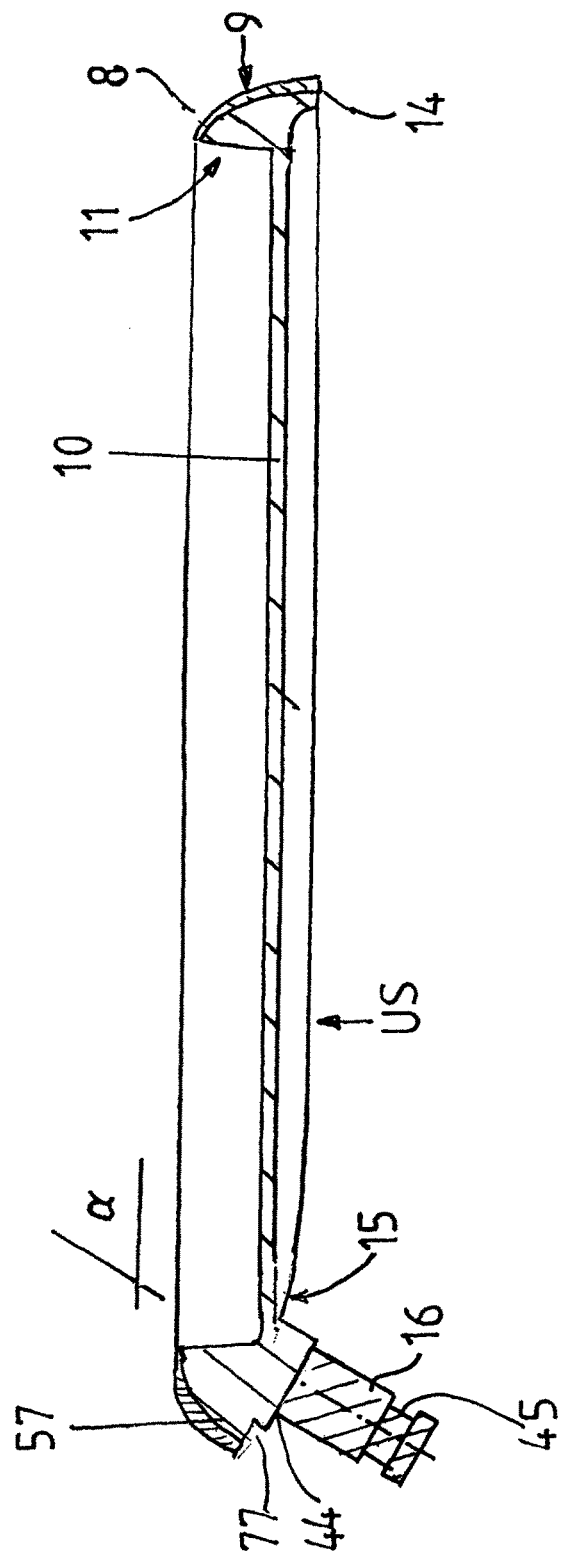
FIG. 4, a section along line G-G in FIG. 3.

A pivot pin 16 extends from the incline 15 in the center of the longitudinal side L in the direction of the lower part 6. The tilt angle α and that of the pivot pin 16 relative to vertical can be up to 90°, preferably 45° (see FIGS. 3 and 4). The tilt angle of the incline 15 is matched to the tilt angle of the pivot pin 16.

The upper part 1 with pivot pin 16 is preferred to be made of metal, for example a light metal alloy such as AlMg, or is made of steel. However, it can also be made of impact-resistant plastic.

In the case where the pivot pin 16 is made of metal, it is connected to the frame 8 in form-fitted fashion. If the upper part 1 and the pivot pin 16 are made of plastic, the frame 8 and the pivot pin 16 can be bonded into one material piece through a molding-on process.

Figure 5:
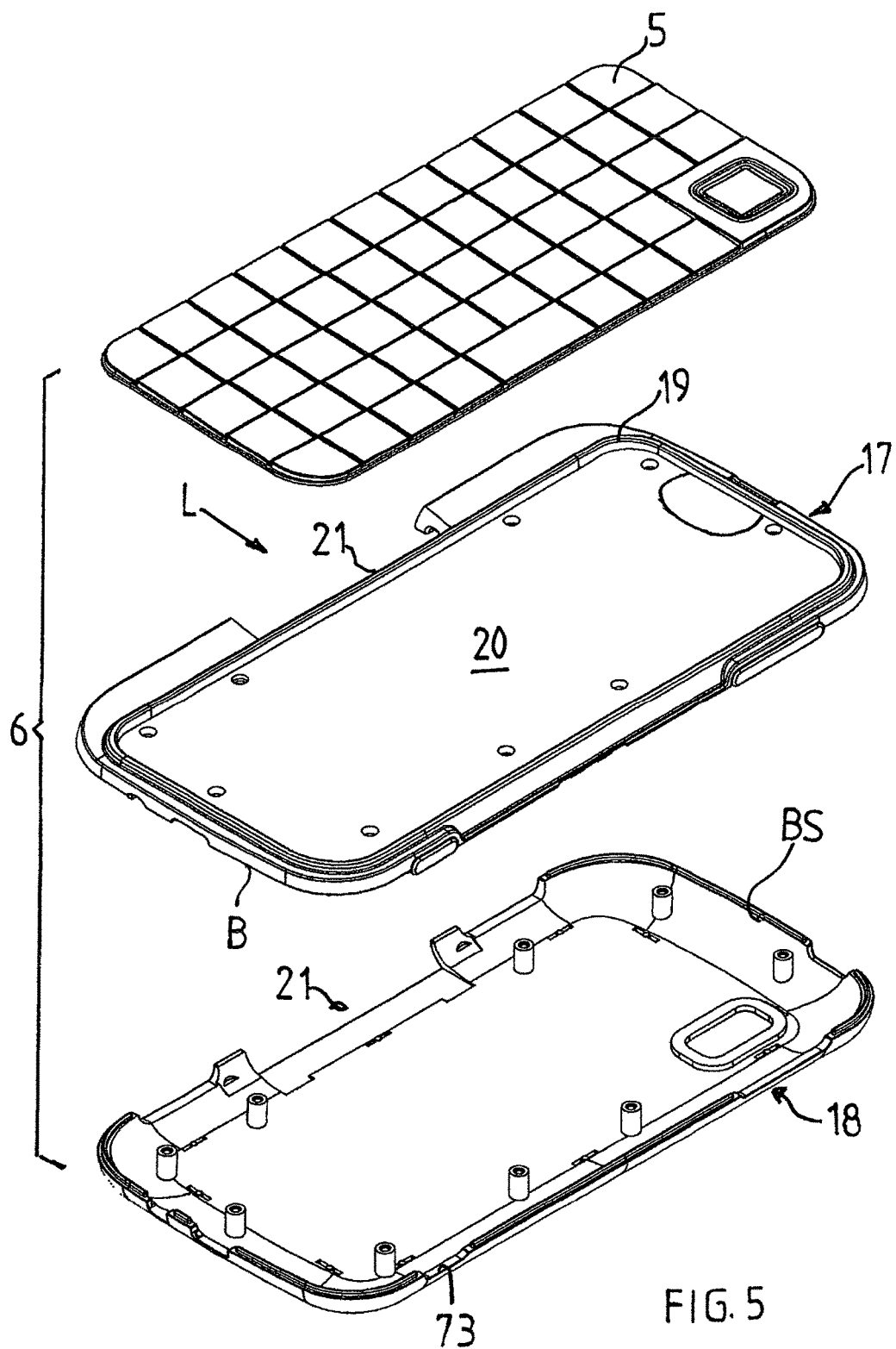
FIG. 5, an exploded representation of the lower part.

The lower part 6 substantially comprises the electronic module 4, the keypad 5, a frame section 17, a bottom shell 18 and a cover, which is not shown. The frame section 17 and the bottom shell 18 are made of plastic and are held together by way of screwed connections (see FIG. 5).

Figure 6:
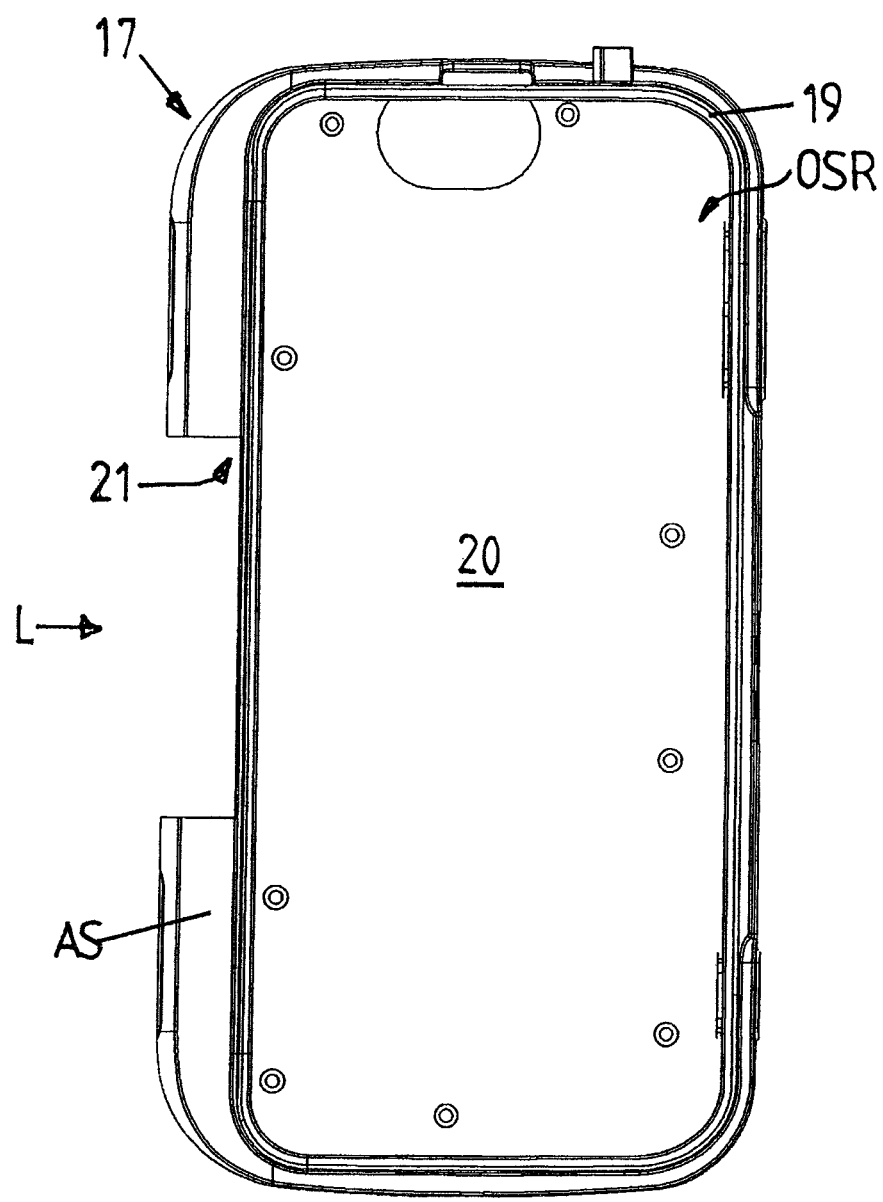
FIG. 6, a top view of the frame section of the lower part.

The frame section 17, as shown in FIG. 6, has a peripheral protrusion 19 on the upper surface OSR thereof; the protrusion bordering a support surface 20 for receiving the keypad 5.

A recess 21 is made in the frame section 17 and the bottom shell 18 on the longitudinal side L associated with the joint element 7, the size of said recess being tailored to the dimensions of the joint element 7.

The width and length of the peripheral protrusion 19 is matched with the partially bordering edge 14 on the upper part 1, such that the edge 14 can encompass the protrusion 19 in the closed position, so that the keypad 5 with the electronic module 4 is protected against impacts and blows. The longitudinal side L of the frame section 17 has an incline AS that corresponds with the angular position of the incline 15 of the frame 8.

Figure 7:
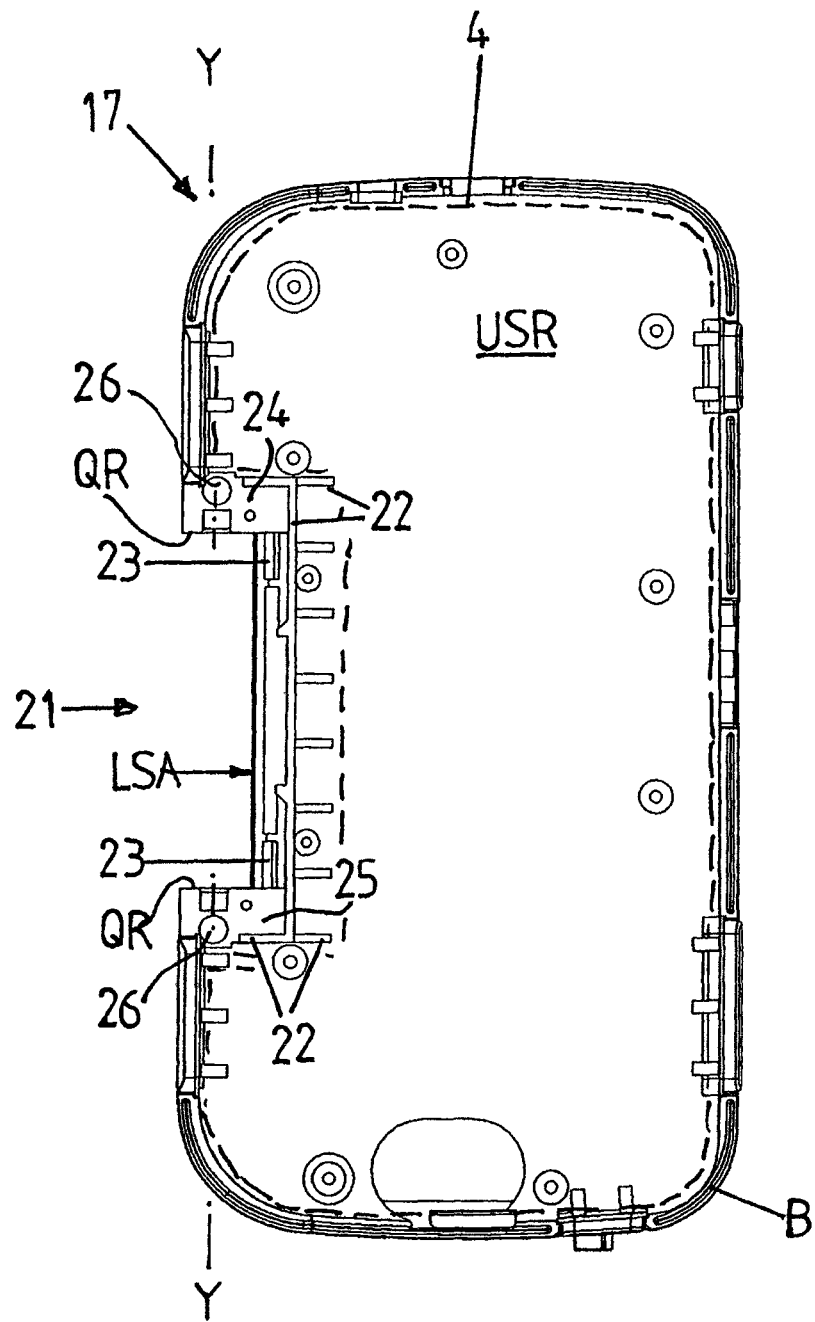
FIG. 7, a view of the back side of the frame section.

As illustrated in FIG. 7, on the bottom side USR of the frame section 17, the recess 21 is bordered by a raised bordering and reinforcing wall 22, wherein stops 23 with films for damping the impact energy during blows are disposed at the wall area associated with the longitudinal side LSA of the recess 21, each of said stops being in vertical alignment with the lateral side QS of recess 21. Directly at the periphery of the frame section 17 are two bearing half-shells 24, 25 of a bearing on each lateral side QS of the recess 21, the half-shells facing one another in alignment with the pivot axis Y-Y and formed into the bottom side USR of the frame section 17. Each of the bearing half-shells 24 and 25 is provided with a stop 26. It is helpful for these stops 26 to be made of metal and be screwed into the bottom side USR of the frame section 17 (see FIG. 4). The frame section 17, moreover, has a collar B running along the outer periphery thereof, the collar being matched with the collar BS protruding up from the bottom shell 18.

FIGS. 8 through 10a and 10b show the joint element 7, which is designed eccentrically, and which comprises a main body 27 and a bearing part 28.

The main body 27 is able to rotate about an off-centered longitudinal axis by way of shaft ends 29 and 30, which are formed at the cogged ends 31 and 32 of the main body 27.

The cogged ends 31 and 32 have protrusions 33 and 34, which face stops 23, which are at the recess 21 on frame section 17 of the lower part 6, in the direction of the joint element 7, which is installed on the frame 8 of the upper part 1.

The bearing part 28 has an incorporated guide notch 35, which is aligned with the protrusions 33 and 34 parallel to recess 21, the notch serving to hold and act as a counter-bearing to a spring clamp 36 (see FIG. 10), the function of which will be detailed in section (0059).

Figure 8:
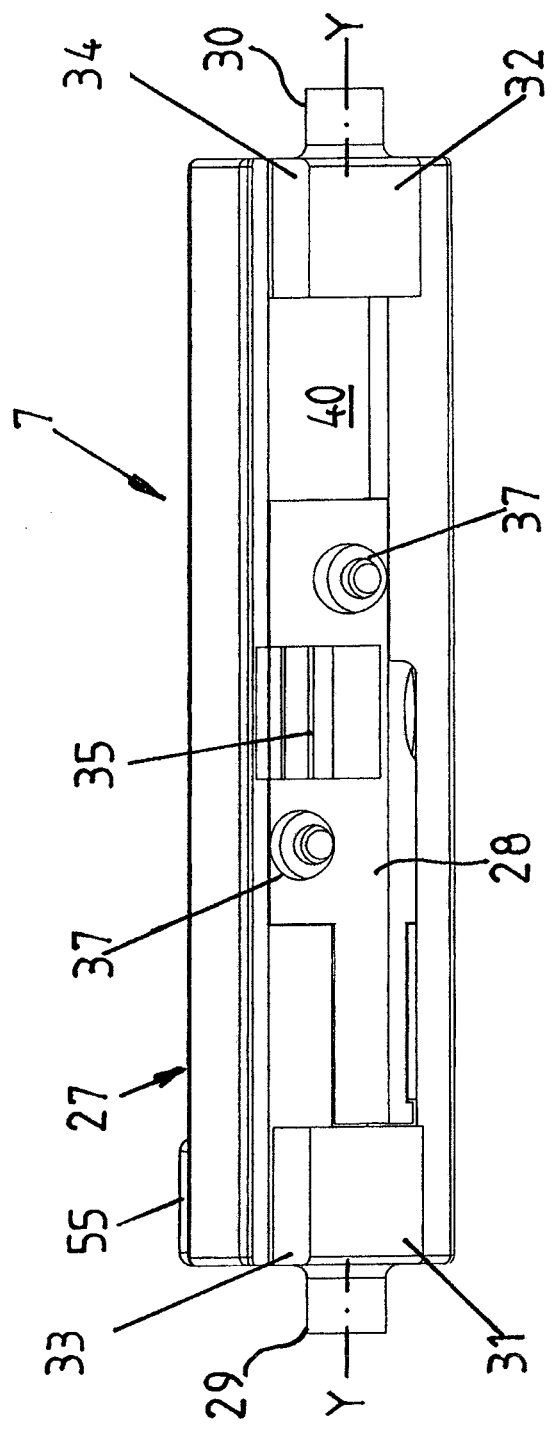
FIG. 8, a front view of the joint element.
Figure 9:
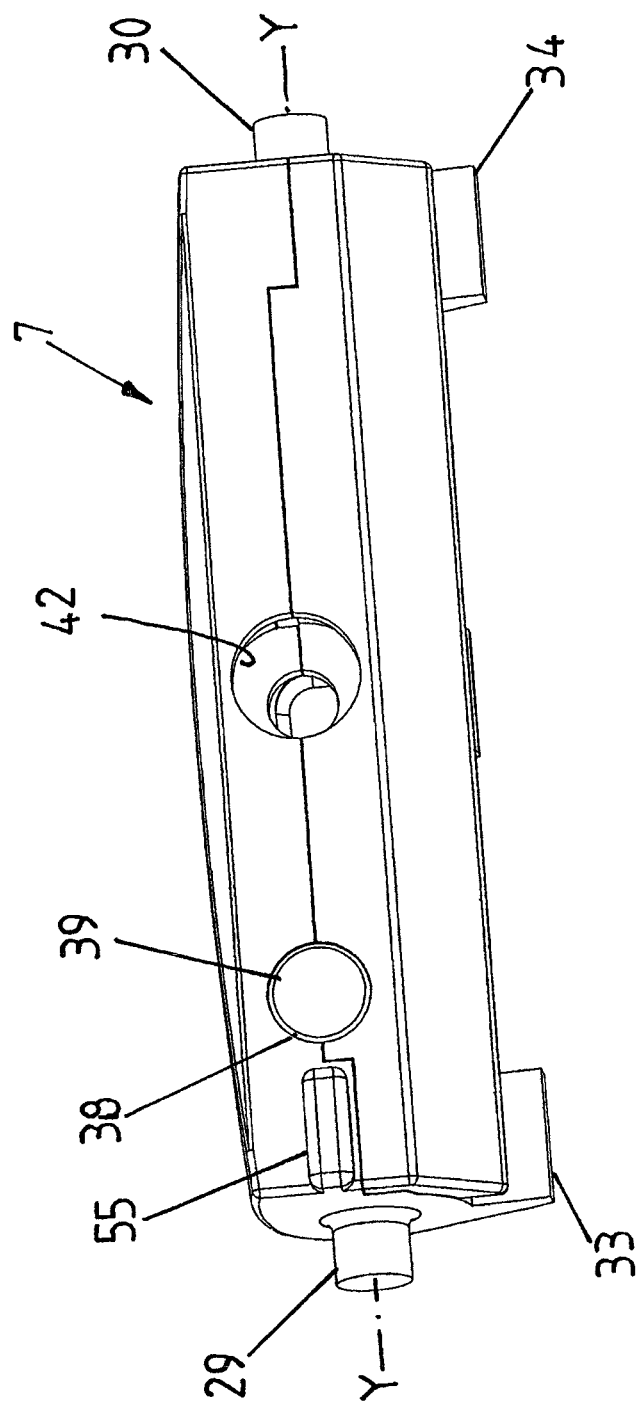
FIG. 9, a perspective front view of the joint element.
Figure 10A:
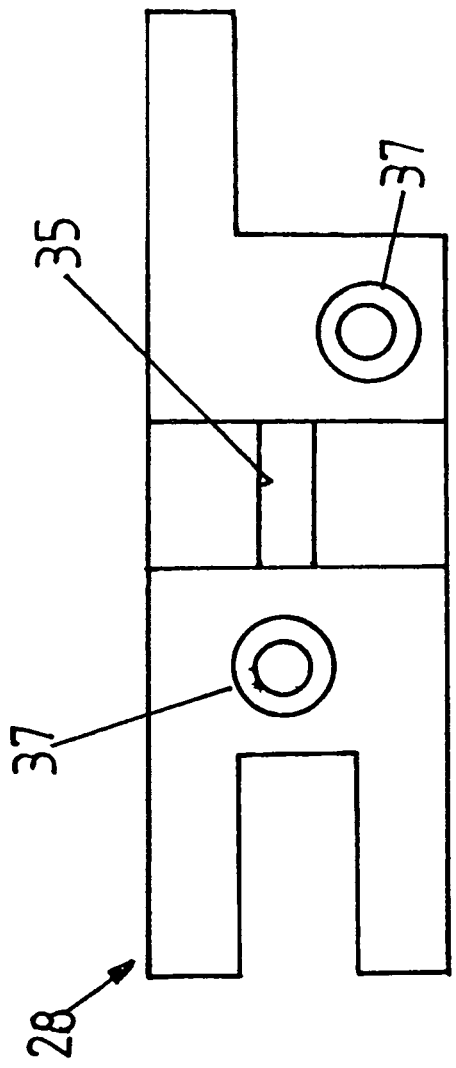
FIGS. 10a and 10b, views of the bearing part.
Figure 10B:
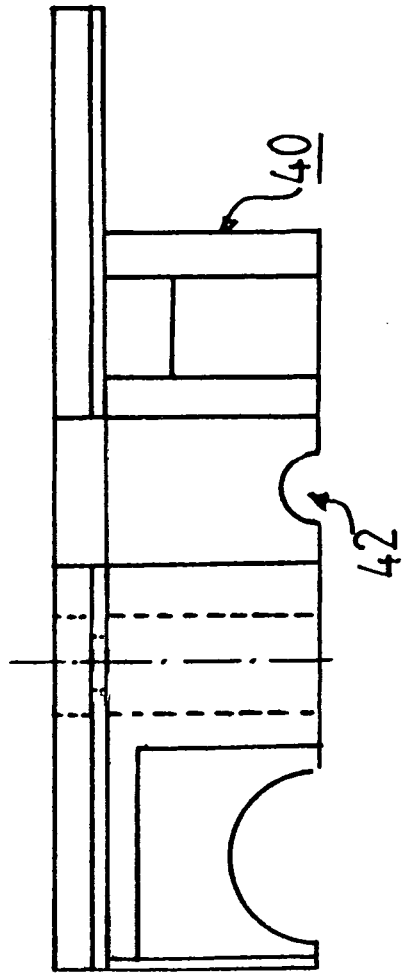

The bearing part 28 and the main body 27 are fastened together through screwed connections 37, and form a holding space 38 for a permanent magnet 39, an entry space 40 for a flexible cable 41, and a pin seat 42 for the pivot pin 16, wherein an annular chamber 43 is formed in the pin seat 42, the chamber being connected to the entry space 40 so that the flexible cable 41 can be led through (see FIG. 8 through 10).

The main body 27 and the bearing part 28 are matched such that the pin seat 42 is divided into two equally sized halves, so that when the bearing part 28 is placed into the main body 27, the pin seat 42 forms.

Figure 11:
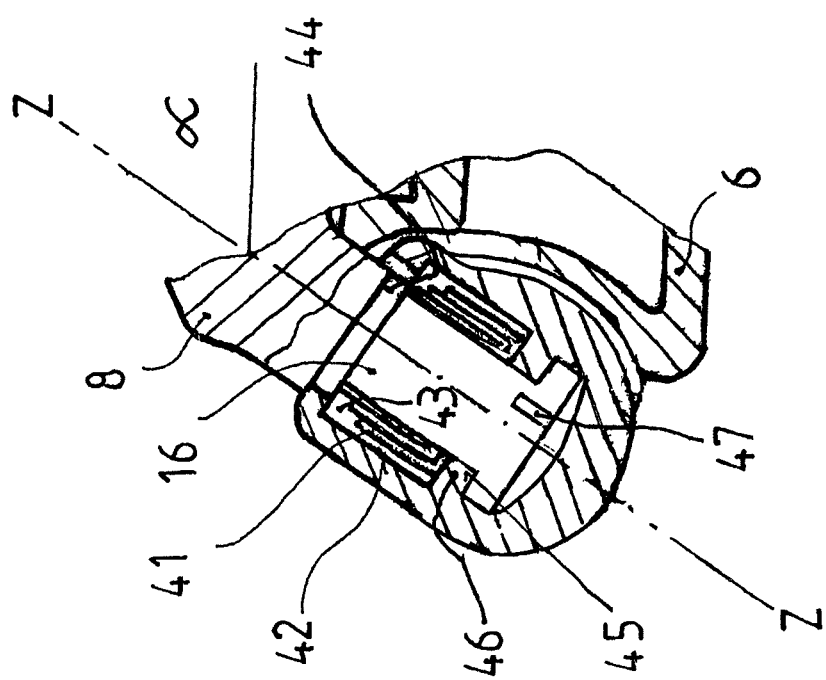
FIG. 11, a section of the pivot pin placed in the bearing seat of the joint element.

The pivot pin 16 (see FIG. 11) has a collar 44 formed at the base thereof for secure guiding into the pin seat 42, the diameter of the collar being matched to the entry-side diameter in the pin seat 42. At the head, the pivot pin 16 has a peripheral groove 45 into which a half-washer 46 formed in the main body 27 and the bearing part 28 can engage, such that the pivot pin 16 is secured against vertical forces in the installed state.

This comes with the extraordinary advantage that during installation, the main body 27 is easily mounted on the pivot pin 16, and, after placing and fastening the bearing part 28 on the main body 27, the pivot pin 16 is safely seated in the pin seat 42 in a form-fitted manner without play.

There is a blind hole 47 located on the back end of the pivot pin 16 into which is placed a compression spring 48, one end of which dampens the rotational motion of the pivot pin. The other end of the compression spring 48 sits fixed against the main body 27.

The main body 27 and bearing part 28 are made of metal, preferably a light metal alloy such as AlMg.

Figure 12A:
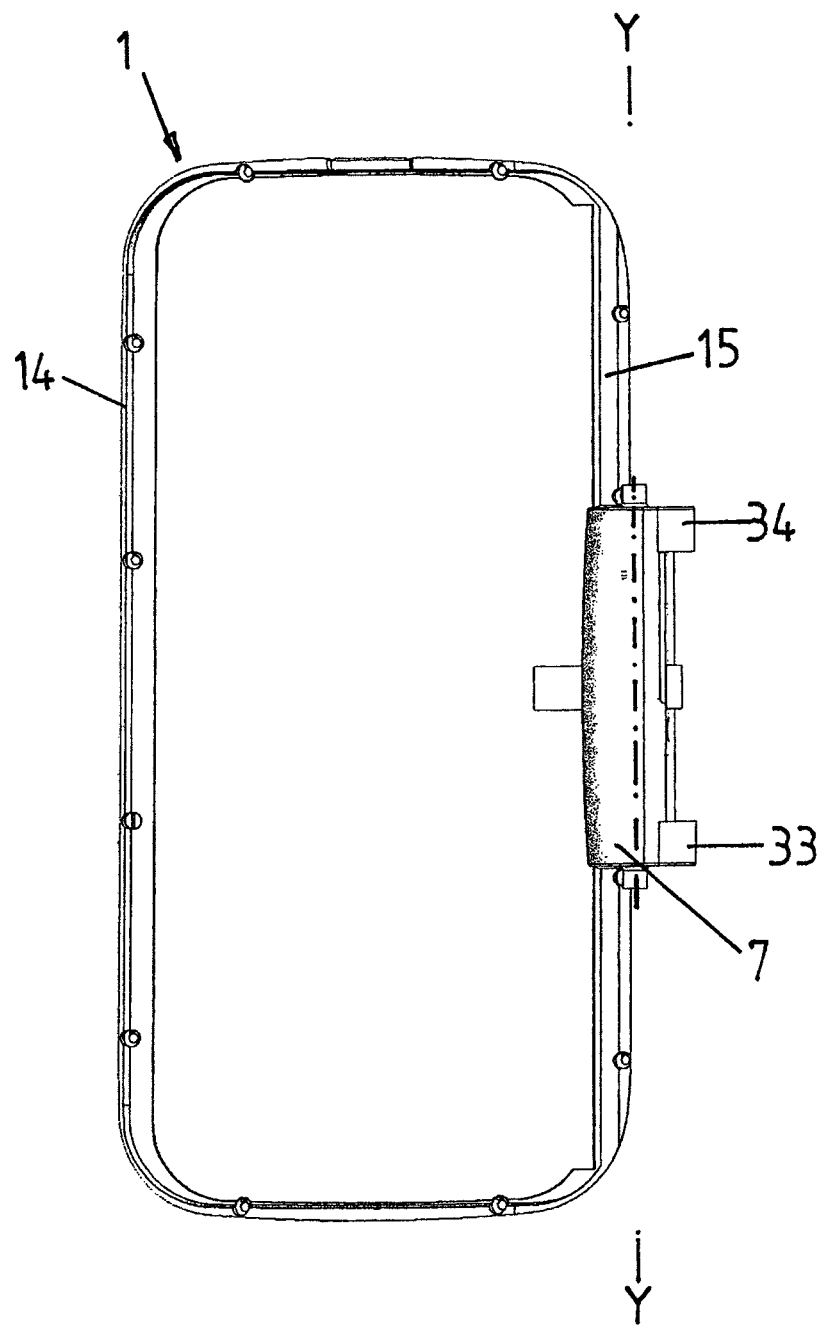

FIGS. 12a to 12c show the back side of the upper part 1 in top views and a side view. The pivot axis Y-Y of the joint element 7 runs in a plane which is shifted outward parallel relative to the upper part 1 (display 3) and substantially below the upper part 1, the plane positioned at the bottom side USR of the frame section 17, coinciding with or coming to cover the bearing half-shells 24 and 25 of two bearings 49 and 50 for holding shaft ends 29 and 30 of the joint element 7, said half-shells being formed in the bottom side USR.

Figure 12D:
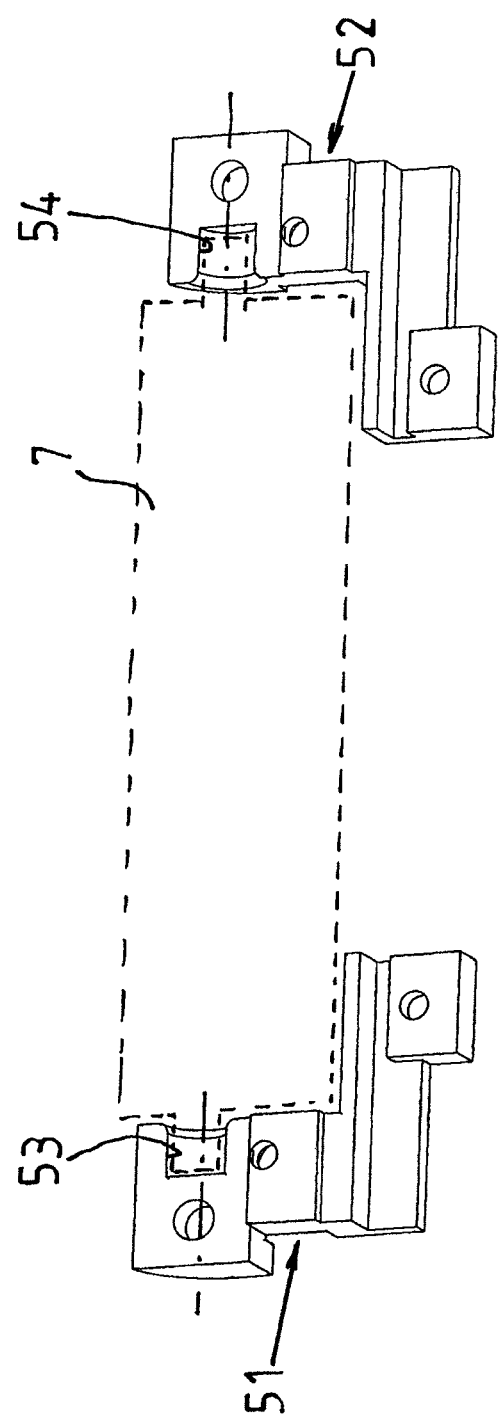
FIG. 12d shows brackets for attachment to the joint element.

The shaft ends 29 and 30, which lie in the bearing half-shells 24 and 25, are secured by way of brackets 51 and 52. Corresponding bearing half-shells 53 and 54 are formed in the brackets 51 and 52, the dimensions of said half-shells corresponding with bearing half-shells 24 and 25. Brackets 51 and 52 are fastened to the bottom side USR of frame section 17 using screws 78 (see FIG. 12d).

Stops 26, previously described herein, prevent horizontal shifting of the shaft ends 29 and 30.

Brackets 51 and 52 are made of plastics and thereby provide for a low-wear and low-friction mounting of the shaft ends 29 and 30 in bearings 49 and 50.

The functioning of the opening and closing processes will now be described with reference to FIGS. 13 to 19.

Figure 13:
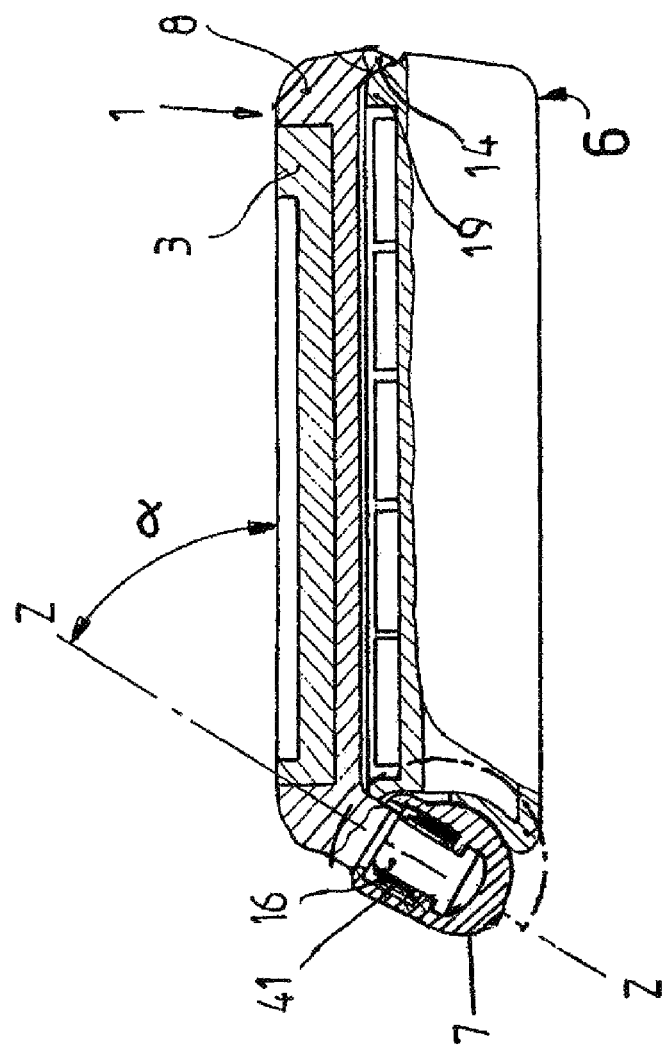
FIG. 13, a partial section along line A-A in FIG. 2, wherein the upper part and the lower part are in the closed position.

FIG. 13 shows the communication device according to the invention in the closed position. The upper part 1 and the display 3 located on the outside thereof lie on top of and cover keypad 5. The pivot pin 16 is located in the pin seat 42 in the joint element 7 and has a tilted position relative to the upper part 1 and the display 3, wherein the pivot axis X-X of the pivot pin 14 is deflected from the tilt axis Z-Z thereof. This makes rotation of the pivot pin 16 about rotational axis X-X in the closed position impossible. The tilt angle α of the pivot pin 16 can assume values of up to 90°.

Figure 14:
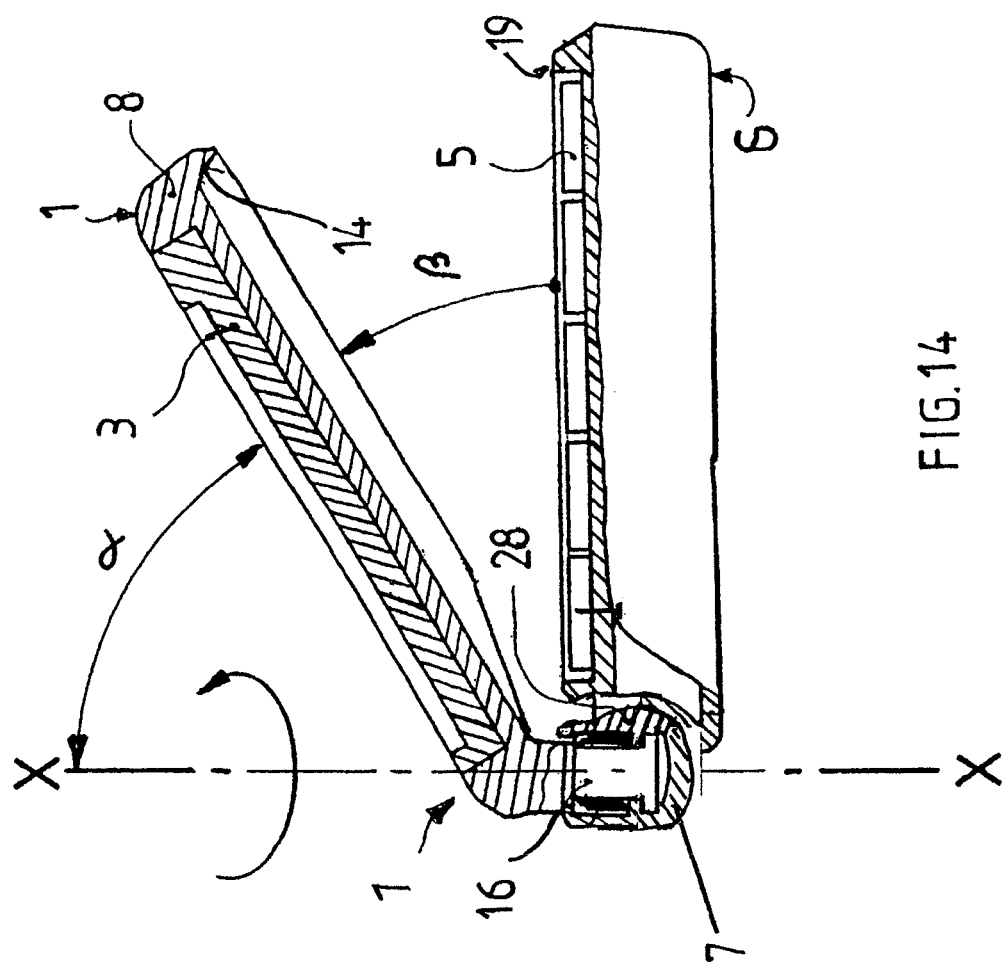
FIG. 14, a partial view along line A-A in FIG. 2, wherein the upper part and display are tilted about the horizontal pivot axis to the first open position, and the tilt angle of the pivot pin aligns with the vertical rotational axis so that 180° rotation is possible.
Figure 15:
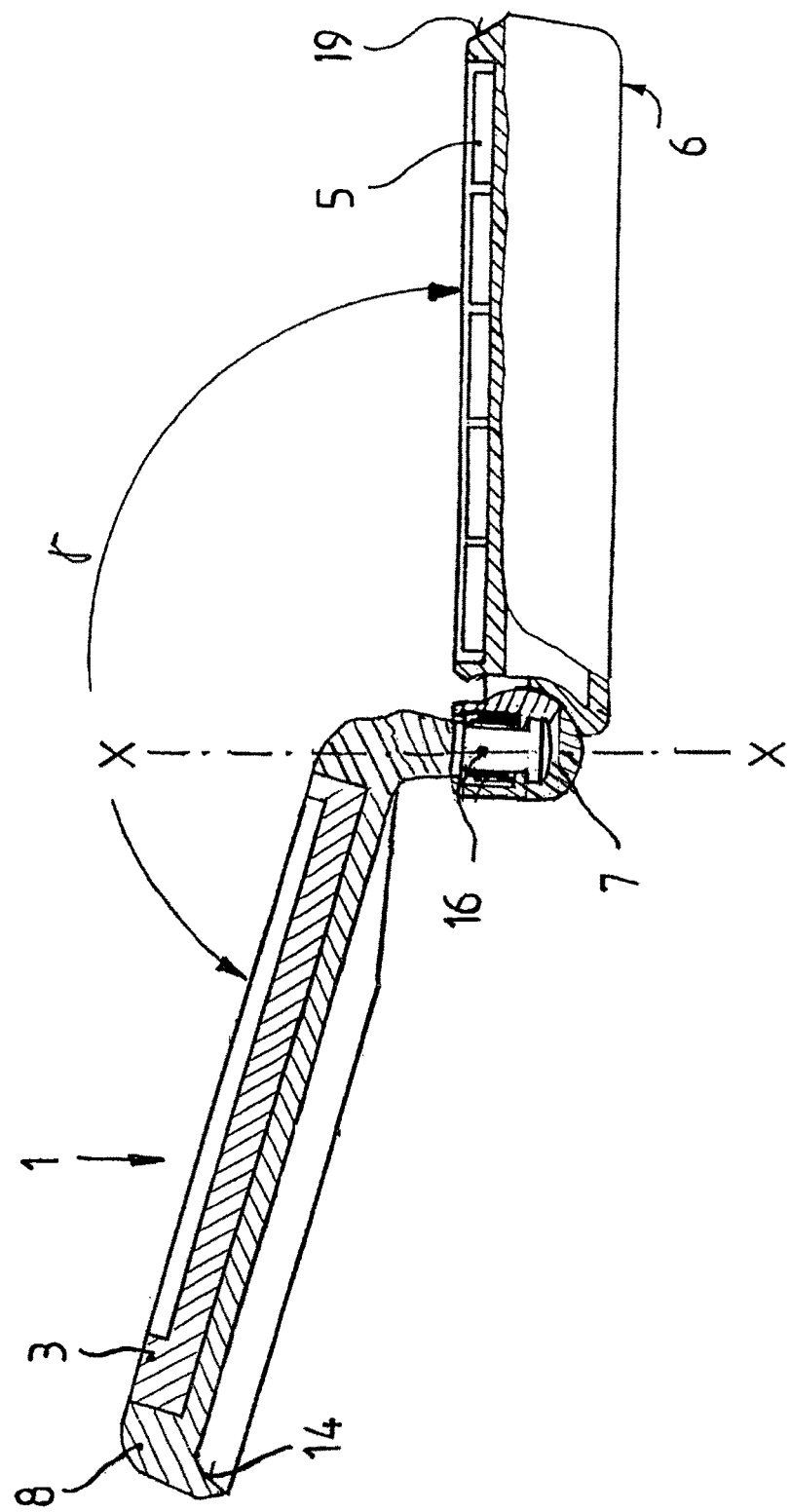
FIG. 15, a partial section along line A-A in FIG. 2, wherein the upper part and the display are rotated about the rotational axis by 180°, and the second open position has been reached.

In FIG. 14, the upper part 1 has reached the first open position relative to the lower part 6 after the tilt axis Z-Z has been brought in alignment with the perpendicular rotational axis X-X by pivoting about pivot axis Y-Y by an angle β of about 65° to 45°. Protrusions 33 and 34 reach stops 23 at recess 21 at frame section 17 of lower part 6 (see FIG. 4 as well). The upper part 1 and the display 3 thereof are now ready for a rotation of 180° about rotational axis X-X so that display 3 comes to a tilt angle γ of 135° to 180°, relative to keypad 5. This position corresponds to the second open position and is shown in FIG. 15.

To limit the rotation or turn of the upper part 1 and the display 3 about rotational axis X-X to 180°, the main body 27 is provided with a protrusion 55 that is located right next to holding space 38 for permanent magnet 39 and that is approximately perpendicular above rotational axis Y-Y near the cogged end 31 of joint element 7. Two depressions 56 are associated with this protrusion 55 in incline 15, the depressions providing a stop after a rotation of 180°, respectively, has been made. Moreover, a permanent magnet 57 is placed into the incline 15 right next to one of the depressions 55 in a seat 77, the magnet cooperating with permanent magnet 39 of joint element 7 in such a way that the permanent magnets 39 and 57 lie along a common axis, wherein each of the magnets exerts a fixing force onto the rotational motion in the N-S direction thereof toward the other magnet, respectively (see FIG. 4 as well).

Figure 16:
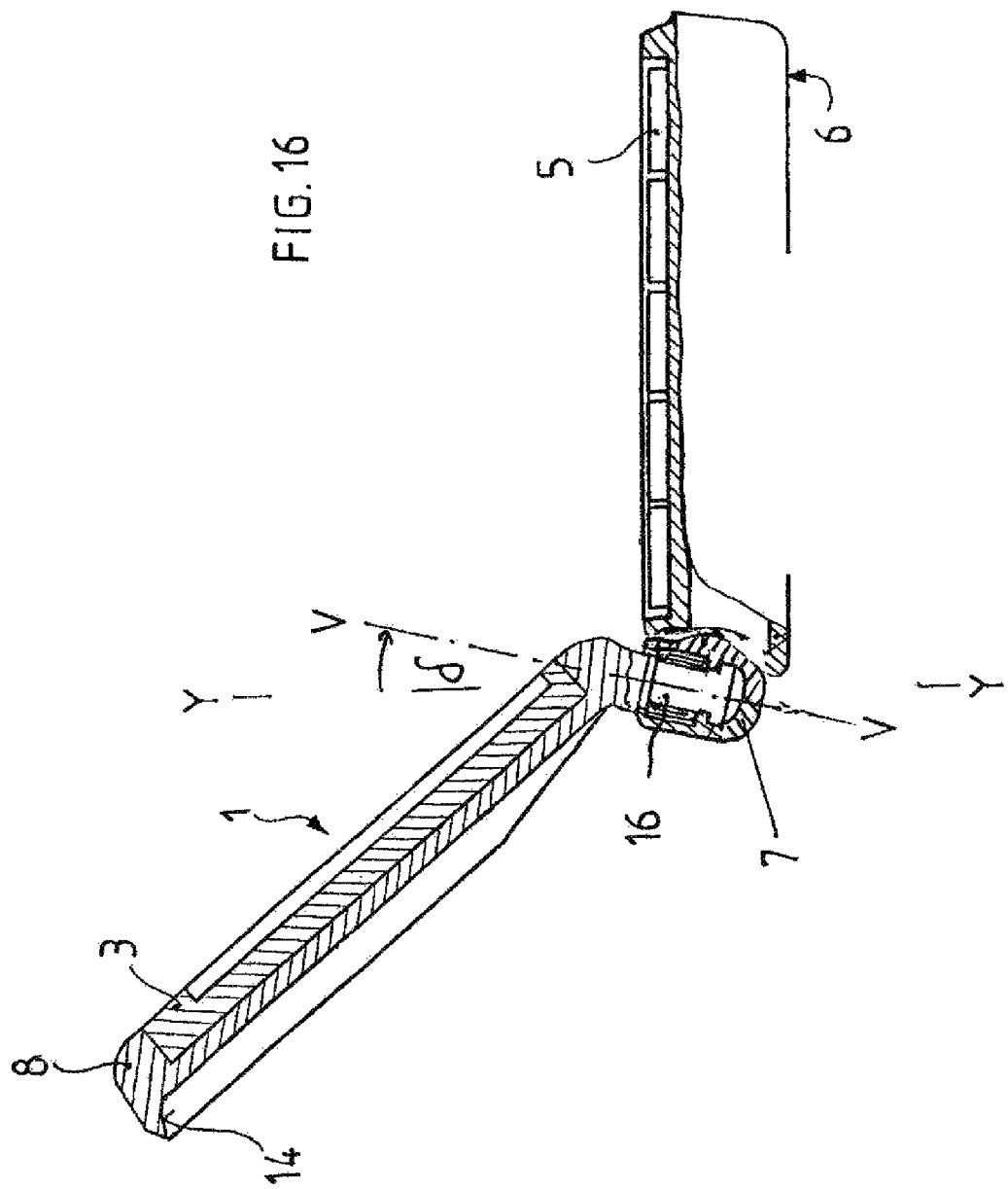
FIG. 16, a partial section along line A-A in FIG. 2, wherein the upper part featuring the display is tilted from the second open position to the third open position.
Figure 17:
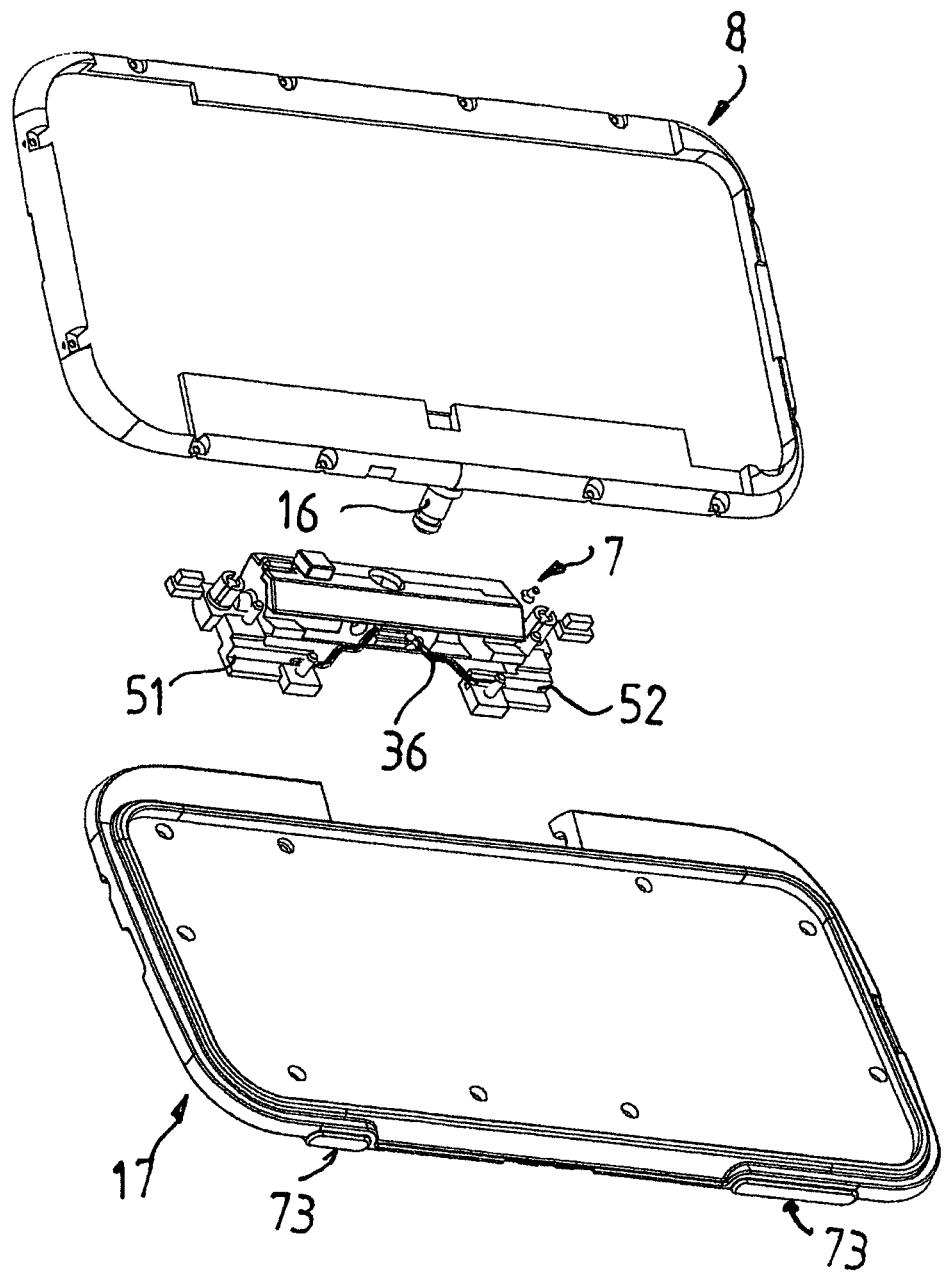
FIG. 17, a perspective representation of the communication device according to the invention according to FIG. 6.

To describe the third open position, reference is made to FIGS. 16 and 17, in which joint element 7 is shown in exploded representation and spring clamp 36 is also shown.

Spring clamp 36 lies in the middle of the guide groove 35 of bearing part 28 and is supported in the groove 35 near the point of maximum extension of the clamp. The ends 58 and 59 of spring clamp 36 lie directly against the stops 23 and are held in position by brackets 51 and 52 (see FIG. 17), such that spring clamp 36 can exert a spring force on joint element 7 and upper part 1, the force helping the user bring the joint element 7 and the upper part 1, including display 3, from the second open position to an angle δ of up to 30°, which is optimum for the user, whereby the upper part can be tilted toward the user about pivot axis Y-Y until rotational axis X-X reaches folding axis V-V.

This is illustrated by FIG. 16 in connection with FIG. 17.

To close the upper part 1 and display 3, which are in the working position in the third open position, upper part 1 is pushed back to the second open position by the user through a pivot motion about pivot axis Y-Y against the pressure force that is applied by spring clamp 36. The upper part then reaches the angular position for making the rotational motion about rotational axis X-X; in other words, tilt angle γ of pivot pin 16 and rotational axis X-X coincide and are positioned perpendicular on pivot axis Y-Y.

The user effects the rotational motion of upper part 1 by 180°, wherein display 3, in turn, becomes the outside of upper part 1 and thereby reaches the first open position in which upper part 1 can be closed to its closed position.

Figure 18:
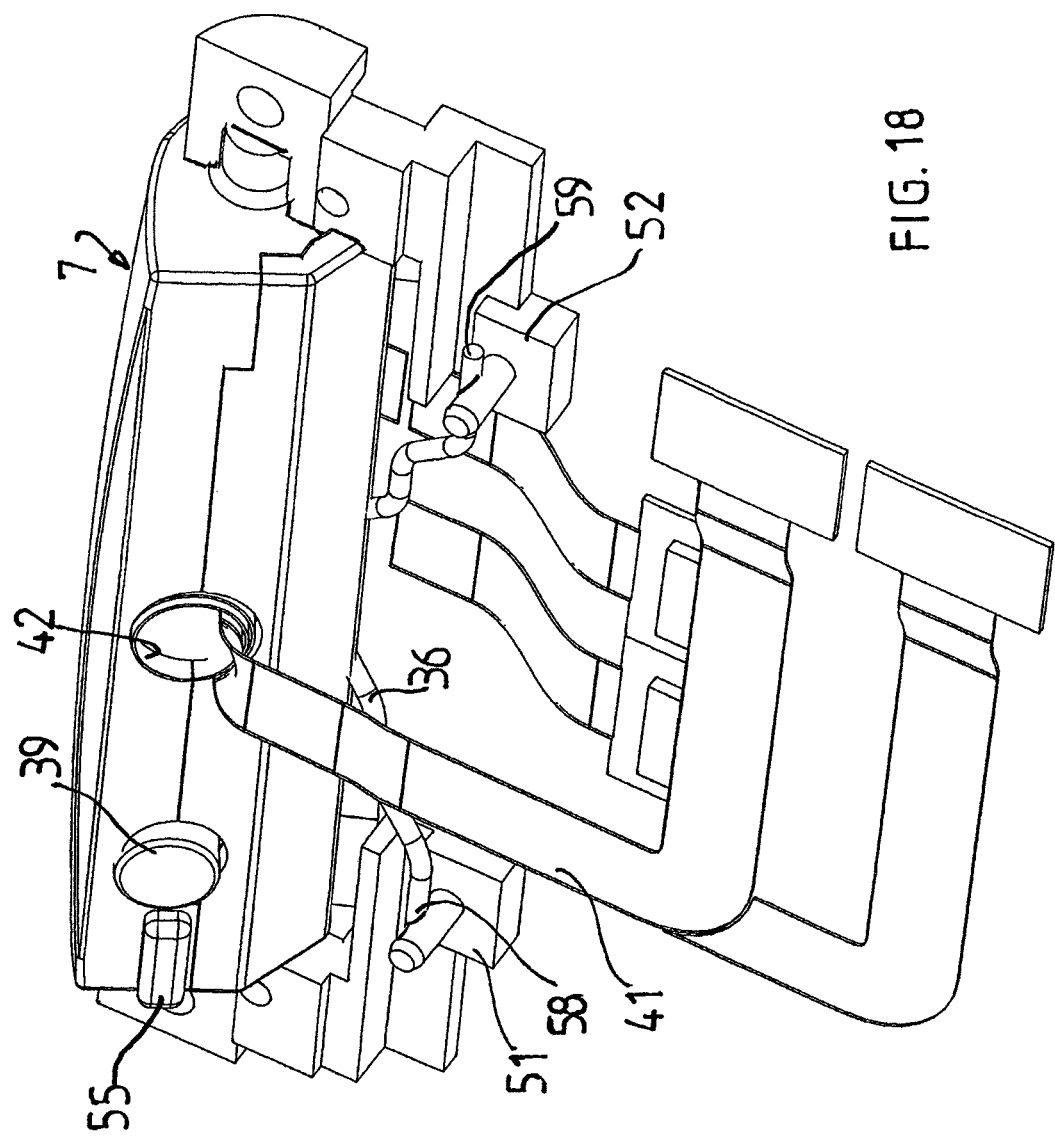
FIG. 18, a perspective representation of the flexible cable connection between the upper and the lower part.

Shown in FIG. 18 in connection with FIGS. 8 and 9 is the electrical connection between the electronic components in upper part 1 and lower part 6. The flexible cable 41 runs from the keypad 5 in the lower part 6 to the entry space 40 of joint element 7, from there through the annular chamber 43 and the pin seat 42 in a plurality of loops around the pivot pin 16 to the electronic equipment in upper part 1. The plurality of loops guarantee that the flexible cable 41 is mechanically stressed only to a minimal extent.

Figure 22:
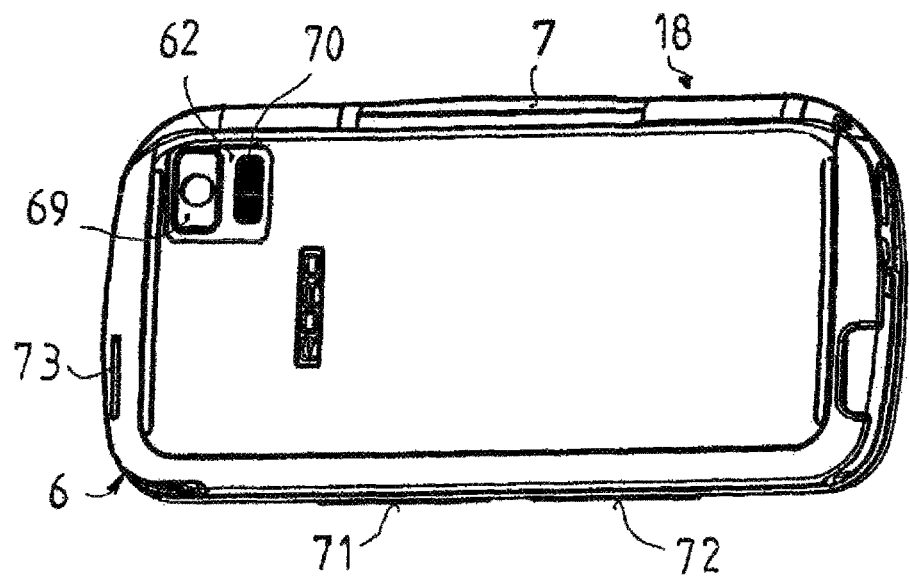
FIG. 22, a view of the back side of the communications device according to the invention having a camera.

To make the available area for display 3 optimally useful, the components of the communication device, such as the loudspeakers 60 and 61, microphones (not shown) and/or a camera 62 (see FIG. 22 as well), are kept inside the bottom shell 18 in bottom part 6.

Figure 19:
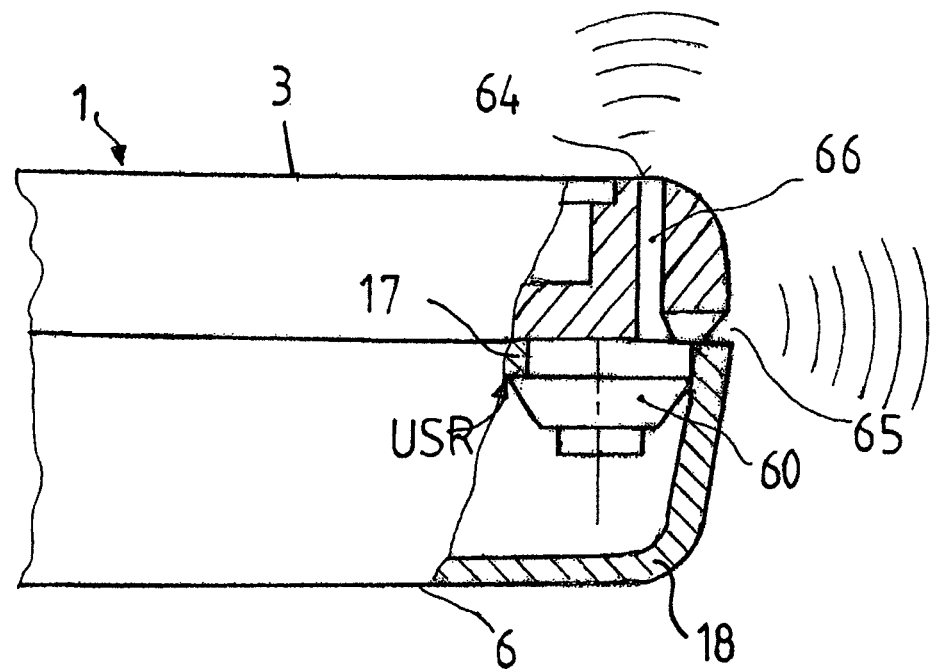
FIG. 19, a partial section along line E-E in FIG. 2.

As shown in FIG. 19, loudspeaker 60 is disposed in a depression 63 formed in the bottom side USR of frame section 17 and the sound direction is directed toward display 3, wherein a first sound outlet opening 64, which is situated in the direction of display 5 and located at the outer back edge of frame section 17, and a second sound outlet opening 65, which is cut out at the upper edge of bottom shell 18, are associated with loudspeaker 60.

Figure 20:
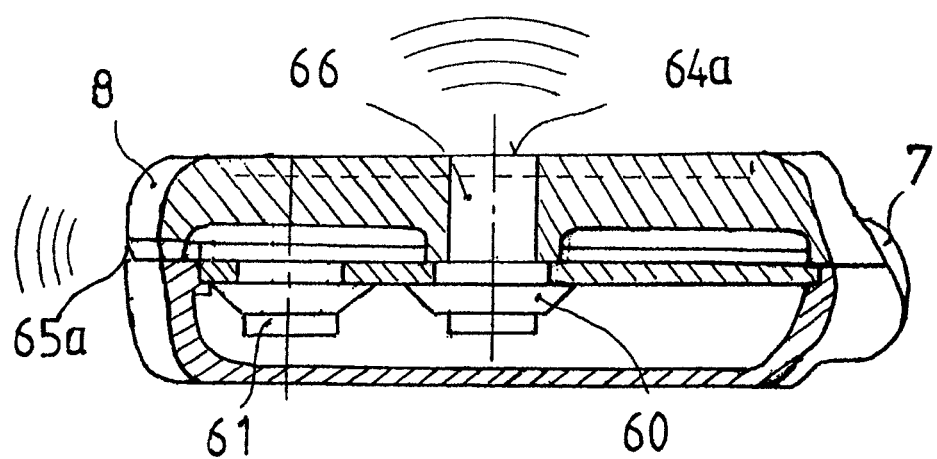
FIG. 20, a partial section along line F-F in FIG. 2.

An alternative to this is shown in FIG. 20, in which one loudspeaker 60 for listening and a second loudspeaker 61 for ringing are provided. For this purpose, loudspeaker 60 for listening is connected to sound outlet opening 64*a* by way of a closed channel 66, and loudspeaker 61 for ringing is connected to sound outlet opening 65*b*.

Figure 21:
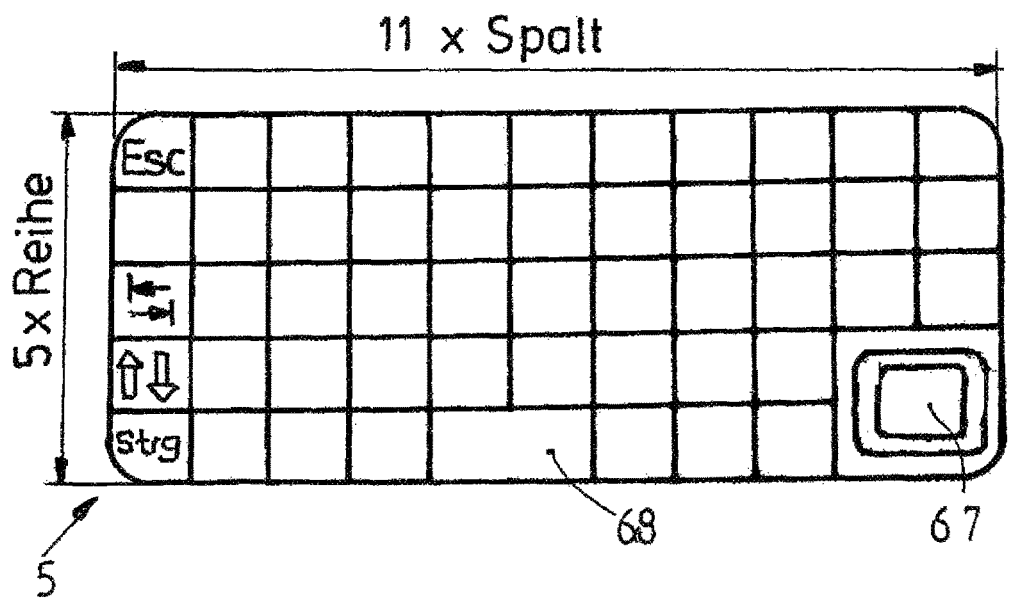
FIG. 21, a top view of the keypad in a 5×11 matrix.

Shown in FIG. 21 is an example of an embodiment of keypad 5. Keypad 5 can be exchanged such that the communication device according to the invention can be equipped with a corresponding keypad 5 for any language in the world, whereby typing proficiency, which had been learned for a particular language, remains the same.

The keys in keypad 5 are arranged in a matrix of 5×11 fields, wherein the cursor key 67 takes up four fields and the space key 68 takes up two fields, so that a total of 51 keys are available. In the first column of the matrix, the ESC, the tab, small type/capitals switch and CTRL keys are arranged vertically. Keypad 5, then, has the dimensions of 50 mm×121 mm.

Camera 62 is kept in the bottom shell 18 of lower part 6, the camera consisting of a digital camera 69 and a flash device 70. This camera 62 is designed such that it can be removed from bottom shell 18 (see FIG. 22).

Moreover, display 3 comprises two multimedia buttons 71, 72 at a longitudinal side L opposite joint element 7, and the function of the buttons that can be shown on display 3 depends on the need and the application. Recesses 73 are made in the longitudinal sides L of frame section 17 and bottom shell 18 in order to hold other buttons, such as buttons for games (see FIG. 5, 17 also).

Figure 23:
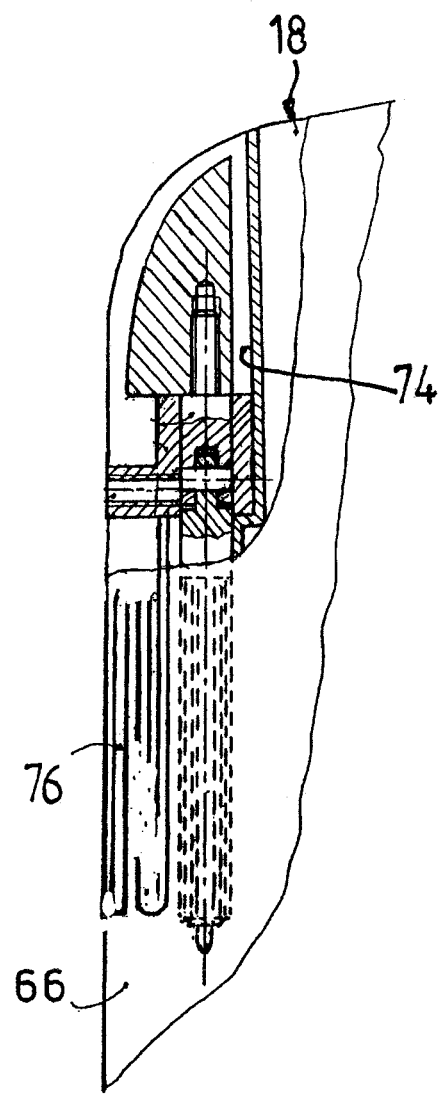
FIG. 23, a sectional representation of the touch pen chamber with attached internal antenna.

To provide better informational capacity of the communication device according to the invention, a touch pen chamber 74 for holding a touch pen 75 is located in bottom shell 18, wherein the touch pen chamber 74 is provided with an attached or vapor-deposited internal antenna 76 for receiving radio and/or DVBT television by way of a TV receiver part kept in the bottom shell (see FIG. 23).

Figure 24:
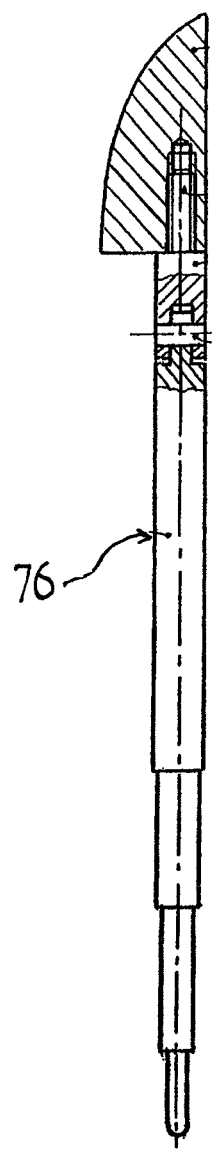
FIG. 24, a representation of the touch pen as a telescopic antenna.

Alternatively, the touch pen 75 can also be designed as an antenna, wherein the latter can be designed to be telescopic (see FIG. 24).

The advantages of the communication device according to the invention are that:

because by moving the horizontal pivot axis in a position, which is shifted parallel outward or inward relative to the upper part and which is below the plane of the display, and because the inclined position of the pivot pin, the display area of the display and the keypad area are enlarged, a smaller design height can be achieved for the upper and the lower parts;

the visual angle can be optimized relative to the display without the need for adjustment;

a compact design is possible in which the components, such as loudspeakers, camera, microphones, or receiver part for radio and television, are kept in the base part, which saves space; and optimum protection of the communication device against impact and blows can be guaranteed by way of form-fitted overlapping of the lower part by the upper part.

The invention claimed is:

1. A portable communication device for multimedia applications, comprising:
 a shell-shaped upper part including a frame, said upper part being adapted to receive components of the communication device and the device being configured so that when the device is in a closed position it has an outside face in the form of a display which defines a display plane;
 a lower part adapted to receive an electronic module, said lower part comprising at least a keypad, a frame section and a bottom shell; and
 a joint element for connecting the upper part and the frame section of the lower part at a longitudinal side of said upper part and said frame section, wherein
 said joint element is pivotably disposed in bearings situated in a bottom side of the frame section providing a horizontal pivot axis of the joint element laying along a periphery of the lower part such that the horizontal pivot axis is in a position which is spaced outward from said upper part,
 said frame of said shell-shaped upper part comprises a pivot pin, said pivot pin protrudes from said frame in the direction of said lower part and in the direction of said joint element at a tilt angle of up to 90 degrees relative to the display plane, said pivot pin is rotably disposed in a pin seat provided in said joint element and thereby provides a rotational axis for said upper part, and said joint element and said pivot pin are configured to permit a pivoting of the upper part about the horizontal pivot axis from a closed position of said upper part, at which the inside of said upper part lies on the keypad of the lower part, to a first open position or from the first open position back to the closed position, and to permit a pivoting of the upper part from the first open position about the rotational axis within an angular range of at least 180 degrees to a second open position, so that in the second open position the display and the keypad are on a same side of the communication device.

2. The portable communication device according to claim 1, wherein:

the frame of the upper part comprises, at least adjacent the joint element, an incline portion which inclines downwardly in a direction from an inner periphery to an outer periphery of the incline portion;

the pivot pin is rotatably disposed, without play in an axial direction of the pivot pin, in the pin seat provided in the joint element; and protrusions are provided at the joint element, stops being provided for the protrusions at a recess in the frame section of the lower part, the stops limiting pivoting motion to the first open position having a first predetermined opening angle where the frame of the upper part can rotate about the pivot pin until another protrusion provided at the joint element engages in a depression provided in the incline portion for purpose of limiting the rotation, whereby after completion of the rotation the display comes to lie in the second open position having a second predetermined opening angle in which the keypad and the display are in a working position relative to one another.

3. The portable communication device according to claim 2, wherein a tilt angle of the incline portions of the frame are up to 90°, relative to the plane of the display.

4. The portable communication device according to claim 2, wherein the first predetermined opening angle is 45° to 65°.

5. The portable communication device according to claim 2, wherein the second predetermined opening angle is from 135° to 180°.

6. The portable communication device according to claim 1, wherein the upper part comprises a frame having a peripheral edge which encloses a peripheral protrusion formed on the frame section of the lower part, whereby the communication device is enclosed in a form-fitted manner for the protection thereof.

7. The portable communication device according to claim 2, wherein:

the joint element is configured eccentrically and comprises cogged ends;

the joint element further comprises at least a main body and a bearing part, the main body and the bearing part being fastened together by screw connections and forming a holding space for a first permanent magnet, an entry space in which a flexible cable is received, and, adjacent the pin seat, an annular chamber which connects with the entry space, the annular chamber allowing the routing of the flexible cable; and bearings for rotatably holding cylindrical shaft ends at a bottom side of the frame section are formed at the cogged ends of the joint element in alignment with the pivot axis.

8. The portable communication device according to claim 7, wherein the flexible cable electrically connects electronic equipment in the lower part with electronic equipment in the upper part by way of the entry space in the joint element via the annular chamber and the pivot pin seat in a plurality of loops around the pivot pin, whereby data can be exchanged between the electronic equipment in the lower part and the electronic equipment in the upper part.

9. The portable communication device according to claim 7, wherein the protrusion for limiting the rotational motion from the first open position to the second open position is disposed at one of the cogged ends of the joint element directly next to the holding space for the permanent magnet and approximately perpendicularly above one of the cylindrical shaft ends.

10. The portable communication device according to claim 7, wherein each of the protrusions for limiting the pivoting motion to the first open position is disposed parallel to the pivot axis at a side of the cogged ends of the joint element facing away from the cylindrical shaft ends.

11. The portable communication device according to claim 7, wherein the bearing part is provided with a guide notch which aligns with the protrusions and the pivot axis in a direction of the recess and which holds a multiply bent spring clamp, wherein the spring clamp exerts a spring force on the upper part when spring ends of the spring clamp are supported by tension at the contact points of the spring ends at brackets fastened to the frame section of the lower part, whereupon the upper part and the display thereof can be brought to a third open position having a third predetermined opening angle.

12. The portable communication device according to claim 11, wherein the third predetermined opening angle is up to 30°.

13. The portable communication device according to claim 2, wherein a holding space for a second permanent magnet is provided in the incline portion of the frame of the upper part, the holding space being so disposed that the first and the second permanent magnets lie along a common vertical axis relative to one another with the poles thereof so arranged that the magnets fix the display in each of the three open positions.

14. The portable communication device according to claim 7, wherein the pivot pin is operatively connected with a compression spring one end of which is fixed in a blind hole of the pivot pin and the other end of which is fixed at the main body of the joint element so that a restoring force of the spring assists or automatically executes the rotation to the second open position after the first open position has been reached.

15. The portable communication device according to claim 7, wherein:

the bearings for holding the shaft ends are disposed opposite one another in alignment with the horizontal pivot axis of the joint element at the recess in the frame section of the lower part:

the bearings are each formed from a first half-shell formed in the bottom side of the frame section of the lower part and a second half-shell formed in respective brackets fastened to the frame section of the lower part;

each of said first half-shells comprises a rear stop which prevents an axial shifting of the shaft ends; and each of the brackets is fastened to a respective one of the second half-shells by screws so that each of the second half-shells lies atop a respective one of the first half-shells to form a respective one of the bearings.

16. The portable communication device according to claim 1, wherein:
the frame of the upper part is made of metal or plastic, the pivot pin is made of metal or plastic and the frame section and the bottom shell of the lower part are made of plastic; and the pivot pin is either integrally bonded with or is form-fitted to the frame of the upper part.

17. The portable communication device according to claim 1, wherein components of the communication device are disposed in the lower part.

18. The portable communication device according to claim 17, wherein:
the components comprise a loudspeaker disposed in a depression that is formed in the bottom side of frame section of the lower part; and
a first sound outlet opening located at the outer back edge of frame section and directing sound toward the display, and a second sound outlet opening at the upper edge of bottom shell are provided for the loudspeaker.

19. The portable communication device according to claim 17, wherein:
the components comprise a first loudspeaker for listening other than to a ringtone and a second loudspeaker provided for listening to a ringtone; and
the first loudspeaker is connected to a first sound outlet opening through a closed channel and the second loudspeaker is connected to a second sound outlet opening.

20. The portable communication device according to claim 17, wherein the components comprise at least two microphones to suppress secondary noises during speech recordings.

21. The portable communication device according to claim 17, wherein the components comprise a camera in the form of a camera module comprising a digital camera with a flash device.

22. The portable communication device according to claim 1 or 2, wherein:
the keypad lies on the frame section of the lower part and can be replaced from the outside;
the keypad comprises a mechanical keypad with a touch-screen function;
the keys of the keypad are arranged in a matrix of 5×11 fields and the cursor key takes up four fields and the space key takes up two fields so that a total of 51 other fields are available for 51 other keys; and
an ESC, Tab, small/caps switch and CTRL keys are arranged vertically in a first column of the matrix, wherein these keys are available directly and with great convenience.

23. The portable communication device according to claim 1, wherein:
the upper part further comprises a switch button adjacent and above a lower end of the upper part for operating a multimedia application and a switch button for the electronic module;
two multimedia buttons are provided at a longitudinal side of the upper part remote from the joint element; and
the frame section and the bottom shell of the lower part comprise recesses at both longitudinal sides of the lower part for receiving additional buttons.

24. The portable communication device according to claim 1, wherein the device is a smart phone, cell phone or cell phone PC.

25. The portable communication device according to claim 3, wherein the tilt angle is 45°.

26. The portable communication device according to claim 17, wherein the components comprise one or more of a loudspeaker, microphone and camera.

27. The portable communication device according to claim 21, wherein the camera module is removable from the bottom shell of the lower part.

28. The portable communication device according to claim 23, wherein the display shows function of at least one of the multimedia buttons.

* * * * *